US012353402B2

(12) United States Patent
Patel et al.

(10) Patent No.: US 12,353,402 B2
(45) Date of Patent: Jul. 8, 2025

(54) GENERATING SCALABILITY SCORES FOR TENANTS USING PERFORMANCE METRICS

(71) Applicant: Salesforce, inc., San Francisco, CA (US)

(72) Inventors: Alok K. Patel, Fremont, CA (US); Amol Suresh Hardikar, Greenbrae, CA (US); Paymon Teyer, San Ramon, CA (US); Karishma Kishore Lalwani, Woodland Hills, CA (US)

(73) Assignee: Salesforce, Inc., San Francisco, CA (US)

( * ) Notice: Subject to any disclaimer, the term of this patent is extended or adjusted under 35 U.S.C. 154(b) by 3 days.

(21) Appl. No.: 17/933,372

(22) Filed: Sep. 19, 2022

(65) Prior Publication Data

US 2023/0089783 A1     Mar. 23, 2023

Related U.S. Application Data

(60) Provisional application No. 63/261,394, filed on Sep. 20, 2021.

(51) Int. Cl.
*G06F 16/23*     (2019.01)
*G06F 11/30*     (2006.01)
*G06F 11/34*     (2006.01)
*G06F 16/2457*   (2019.01)

(52) U.S. Cl.
CPC ...... *G06F 16/2379* (2019.01); *G06F 11/3006* (2013.01); *G06F 11/3409* (2013.01); *G06F 16/24578* (2019.01)

(58) Field of Classification Search
CPC .......... G06F 16/2379; G06F 16/24578; G06F 11/3006; G06F 11/3409
See application file for complete search history.

(56) References Cited

U.S. PATENT DOCUMENTS

| | | | |
|---|---|---|---|
| 10,776,241 B1* | 9/2020 | Christensen | G06N 20/00 |
| 11,226,964 B1* | 1/2022 | Cairney | G06F 16/24553 |
| 2013/0254384 A1* | 9/2013 | Wray | G06F 11/3409 |
| | | | 709/224 |
| 2014/0201838 A1* | 7/2014 | Varsanyi | G06F 21/552 |
| | | | 726/23 |
| 2017/0353477 A1* | 12/2017 | Faigon | G06F 21/554 |

(Continued)

*Primary Examiner* — Ken Hoang
(74) *Attorney, Agent, or Firm* — Holland & Hart LLP

(57) ABSTRACT

Methods, systems, apparatuses, and computer program products are described. A multi-tenant database system may store a set of data logs indicating performance data for multiple tenants of the system. The system may calculate one or more aggregate performance metrics based on performance data for a tenant stored in the logs, where a performance metric of the one or more aggregate performance metrics may be based on design time data for the tenant, runtime data for the tenant, or both. The system may compare the one or more aggregate performance metrics to one or more performance thresholds defined for multiple tenants and may generate scalability scores corresponding to the one or more aggregate performance metrics for the tenant. The system may send, for display at a user interface of a user device operated by a user associated with the tenant, an indication of the generated scalability scores.

20 Claims, 11 Drawing Sheets

(56) References Cited

U.S. PATENT DOCUMENTS

| | | | |
|---|---|---|---|
| 2021/0042180 A1* | 2/2021 | Sutton | G06F 11/0727 |
| 2021/0141900 A1* | 5/2021 | Brown | G06F 21/57 |
| 2021/0165688 A1* | 6/2021 | Reyes | G06F 11/2023 |
| 2022/0215010 A1* | 7/2022 | Dash | G06F 18/2137 |
| 2023/0053592 A1* | 2/2023 | Myron | G06F 11/3664 |

* cited by examiner

GENERATING SCALABILITY SCORES FOR TENANTS USING PERFORMANCE METRICS

CROSS REFERENCE

The present Application for Patent claims the benefit of U.S. Provisional Patent Application No. 63/261,394 by Patel et al., entitled "GENERATING SCALABILITY SCORES FOR TENANTS USING PERFORMANCE METRICS," filed Sep. 20, 2021, assigned to the assignee hereof, and expressly incorporated by reference in its entirety herein.

FIELD OF TECHNOLOGY

The present disclosure relates generally to database systems and data processing, and more specifically to generating scalability scores for tenants using performance metrics.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform (or another platform) may support systems that store data for multiple tenants. In a highly-customizable platform, different tenants may implement solutions (e.g., code-based solutions, process flows) in different ways. For example, different tenants may leverage different capabilities of the platform to achieve different goals. In some cases, however, the platform may fail to effectively scale these capabilities under load, which may introduce a variety of errors and may impact the platform's performance based on the specific solutions implemented by a tenant. Accordingly, different tenants using the same platform may suffer from different inefficiencies of scale. Identifying and attributing such inefficiencies may be challenging on a tenant-by-tenant basis.

DETAILED DESCRIPTION

Figure 1:
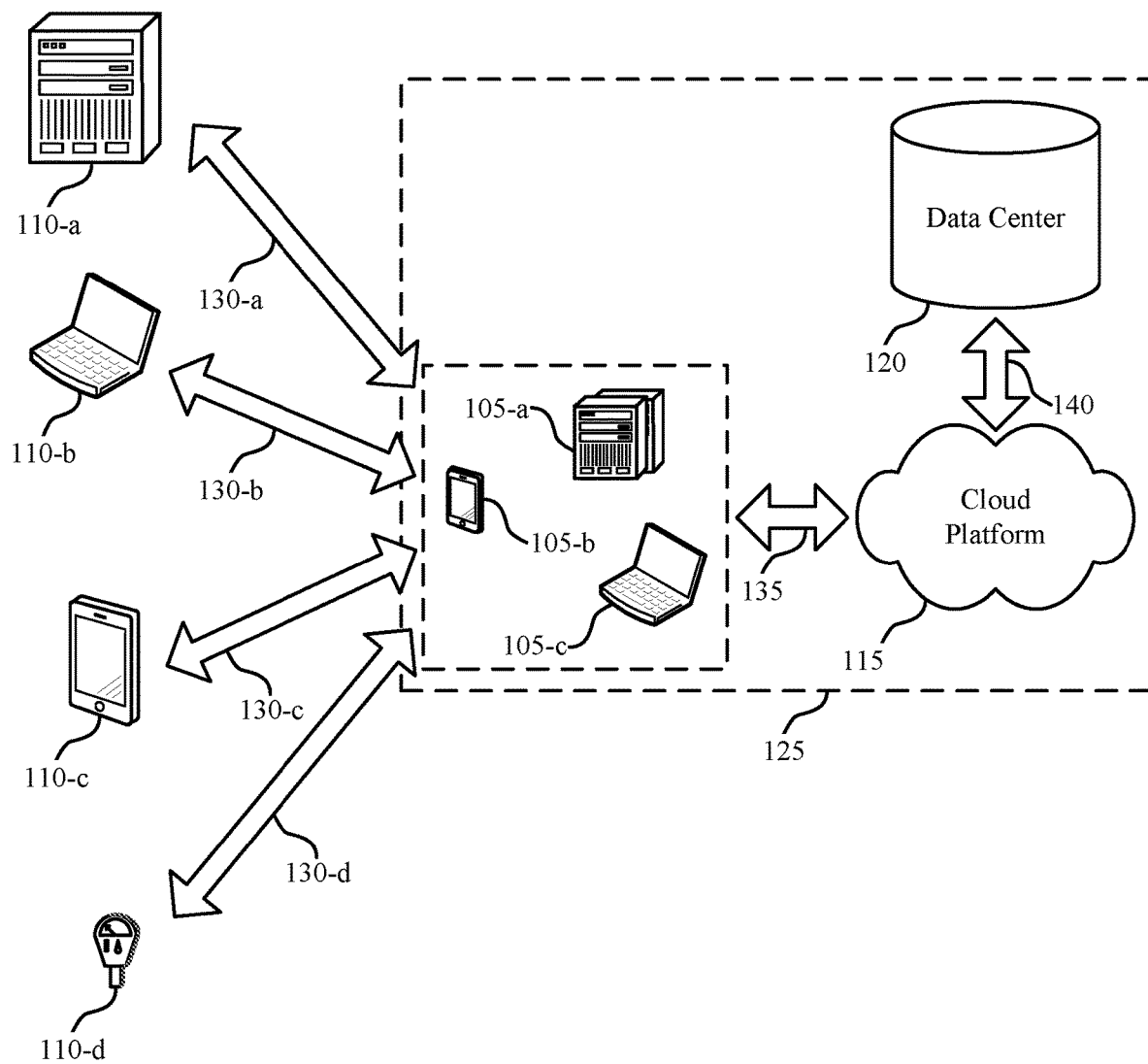
FIG. 1 illustrates an example of a system for cloud computing that supports generating scalability scores for tenants using performance metrics in accordance with aspects of the present disclosure.

Techniques described herein support aggregating performance metrics of multi-tenant, complex systems (e.g., a customer relationships management (CRM) service) into scalability scores for individual tenants. For example, a tenant or users associated with the tenant may use a system that captures performance metrics, customer data, and other metrics associated with an integration (e.g., with an application or other external system or platform) used by the tenant. In some cases, the metrics may be system-level performance metrics, application-level performance metrics, or both, which may be based on a user-defined application. Additionally, or alternatively, the system may identify performance bottlenecks (e.g., inefficiencies of scale), which may be reduced if the user takes corrective actions. In some examples, the system may aggregate the performance metrics and compare aggregate performance metrics for multiple tenants to common performance thresholds to determine scalability scores that can be compared across tenants. The system may provide a tenant one or more scalability scores indicating one or more aspects of the overall performance of that tenant.

Some systems may support a highly-customizable platform in which tenants may implement their solutions in multiple ways. For example, different tenants may use the same CRM service (or other service or platform) but may use the service to reach customers differently. That is, the tenants may leverage different capabilities of the platform to achieve different goals (e.g., sales, marketing, integration, or other functions). However, some platforms, solutions, capabilities, or combination thereof may fail to scale effectively under load, which may introduce a variety of errors, impact performance metrics elsewhere in the application, or some combination thereof. As such, a methodology of scoring aggregated performance metrics for elements belonging to an individual tenant may help provide a consistent and unbiased view of performance health in a multi-tenant system.

Specifically, the techniques described herein integrate a CRM service, a data services platform, and a user interface such that individual tenants may receive scalability scores for an integration based on aggregated performance metrics of a multi-tenant system. A user associated with a tenant may receive an insight associated with performance data and an aggregated scalability score for the tenant indicating how well the integration (e.g., an implementation) is performing and how a corresponding scalability may be improved. For example, a multi-tenant database system may store a set of data logs indicating performance data for multiple tenants of the multi-tenant database system. The multi-tenant database system may calculate, for a tenant of the multiple tenants, one or more aggregate performance metrics based on performance data for the tenant stored in a subset of the set of data logs, where a performance metric of the one or more aggregate performance metrics may be based on design time data for the tenant, runtime data for the tenant, or both. In some cases, the multi-tenant database system may compare the one or more aggregate performance metrics to one or more performance thresholds (e.g., common performance thresholds across tenants) defined for multiple tenants at the multi-tenant database system, and the multi-tenant database system may generate one or more scalability scores corresponding to the one or more aggregate performance metrics for the tenant based on the comparing. In some examples, the multi-tenant database system may send, for display at a user interface of a user device, an indication of the one or more scalability scores, for example, if the user device is operated by a user associated with the tenant.

Aspects of the disclosure are initially described in the context of an environment supporting an on-demand database service. Aspects of the disclosure are then described in the context of a user interface and a process flow. Aspects of the disclosure are further illustrated by and described with reference to apparatus diagrams, system diagrams, and flowcharts that relate to generating scalability scores for tenants using performance metrics.

FIG. 1 illustrates an example of a system 100 for cloud computing that supports generating scalability scores for tenants using performance metrics in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants. As such, performance inefficiencies for a first tenant (e.g., an inefficient use of processing resources at scale) may potentially affect one or more other tenants sharing resources with the first tenant. Analyzing performance metrics and providing performance solutions for a specific tenant may improve system performance and resource availability both to the specific tenant and to other tenants sharing resources with the specific tenant in the multi-tenant system.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

The cloud platform 115, the subsystem 125, or both may support a data services platform. The data services platform may be used to provide insights and scalability scores associated with performance metrics (e.g., performance bottlenecks, inefficiencies of scale) for a tenant. For example, one or more scalability scores may be associated with an integration (e.g., an integration of an external service, database, or application to the data services platform), where the scalability scores indicate the overall performance of the integration and how it may be enhanced or improved. In some examples, the data services platform may include various actions that may be used to score aggregated performance metrics for elements belonging to an individual tenant, including retrieving data (e.g., performance metrics from a CRM service), analyzing the data, creating insights associated with the data, calculating a scalability score, or any combination thereof. In some examples, the data services platform may score the aggregated performance metrics for individual tenants to provide a consistent and unbiased view of performance health in a multi-tenant system. The data services platform may display the scalability score (e.g., as a percentage, a numeric value, a category), a severity—or severity level—of the scalability score (e.g., criticality), suggested corrective actions a user may perform to improve the scalability score (e.g., improve the overall performance of an integration), or any combination thereof.

An organization (e.g., a tenant of a multi-tenant database system) or users associated with a tenant (e.g., employees of the tenant organization) may use a system to capture performance metrics, customer data, and other metrics associated with the tenant. Some systems may support a highly-customizable platform in which tenants may implement their solutions in multiple ways. For example, different tenants may use the same CRM service, but may use the service to reach customers differently. That is, the tenants may leverage different capabilities of the platform to achieve different goals (e.g., for sales, for marketing). Some other systems supporting multi-tenant services and customization may fail to scale effectively under load, which may potentially introduce a variety of errors and may impact performance metrics elsewhere in the systems. For example, a tenant may implement one or more tenant-specific solutions (e.g., code-based solutions, process flow-based solutions) that inefficiently use the available resources (e.g., processing resources, memory resources, time resources), result in errors, or both. In some cases, such inefficiencies may be negligible if used by a small quantity of users (e.g., below a threshold quantity), but may have significant impact on the systems if used at scale (e.g., across a tenant organization or otherwise above a threshold quantity). However, users of tenants with such inefficiencies may not realize that they are contributing to relatively poor performance metrics. For example, these other systems may fail to provide consistent and unbiased views of the performance of a tenant, which may result in workflow inefficiencies and limited performance analytics capabilities.

Techniques described herein and supported by the system 100 may support aggregating performance metrics of multi-tenant, complex systems into scalability scores for individual tenants, which may be supported by the cloud platform 115 and an external user interface and corresponding user device (e.g., a cloud client 105). For example, a user associated with a tenant (e.g., employees of a tenant organization) may use a data services platform to understand insights associated with system-level and application-level performance bottlenecks (e.g., inefficiencies of scale) and to generate scalability scores based on the insights indicating the overall performance of an integration. The data services platform may include tools to score aggregated performance metrics for elements belonging to individual tenants and to provide a consistent and unbiased view of performance health in a multi-tenant system. The data services platform may display the scalability score (e.g., as a percentage or some other value or identifier), a severity level of the scalability score (e.g., an indication of criticality), suggested corrective actions the user may perform to improve the scalability score and overall performance of the integration, or some combination thereof.

The cloud platform 115 may integrate components of a system, including a CRM service, a data services platform, and a user interface and corresponding user device such that individual tenants may receive scalability scores based on aggregated performance metrics for a specific tenant of a multi-tenant system. A user may receive an insight associated with performance data and an aggregated scalability score for a tenant indicating how well the implementation is performing and how the implementation's scalability may be improved. For example, a multi-tenant database system may store a set of data logs indicating (e.g., tracking) performance data for multiple tenants of the multi-tenant database system. The multi-tenant database system may calculate, for a tenant of the multiple tenants, one or more aggregate performance metrics based on performance data for the tenant stored in a subset of the set of data logs, a performance metric of the one or more aggregate performance metrics based on design time data for the tenant, runtime data for the tenant, or both. In some cases, the multi-tenant database system may compare the one or more aggregate performance metrics to one or more performance thresholds defined for multiple tenants at the multi-tenant database system, and the multi-tenant database system may generate one or more scalability scores corresponding to the one or more aggregate performance metrics for the tenant based on the comparing. In some examples, the multi-tenant database system may send, for display at a user interface of a user device, an indication of the one or more scalability scores, the user device operated by a user associated with the tenant.

Aggregating performance metrics of multi-tenant, complex systems into tenant-specific scalability scores for different tenants may support improved workflow efficiencies and reduced processing overhead, for example, by providing a consistent view of overall performance of different implementations and corresponding tenants in the multi-tenant system. For example, because the techniques described herein support providing accurate performance and scale analyses of a tenant (e.g., for a client implementation), the techniques may support reducing processing overhead by improving performance bottlenecks which may increase resource consumption. As another example, the techniques described herein may support providing an accurate performance failure analysis of an implementation and corresponding tenant, which may support improved workflow efficiencies by implementing "best" (e.g., relatively more resource-efficient) coding practices. Additionally, or alternatively, the techniques described herein may support reduced overhead (e.g., processing resource overhead, memory resource overhead) associated with providing the same solution across multiple tenants regardless of tenant-specific implementations.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
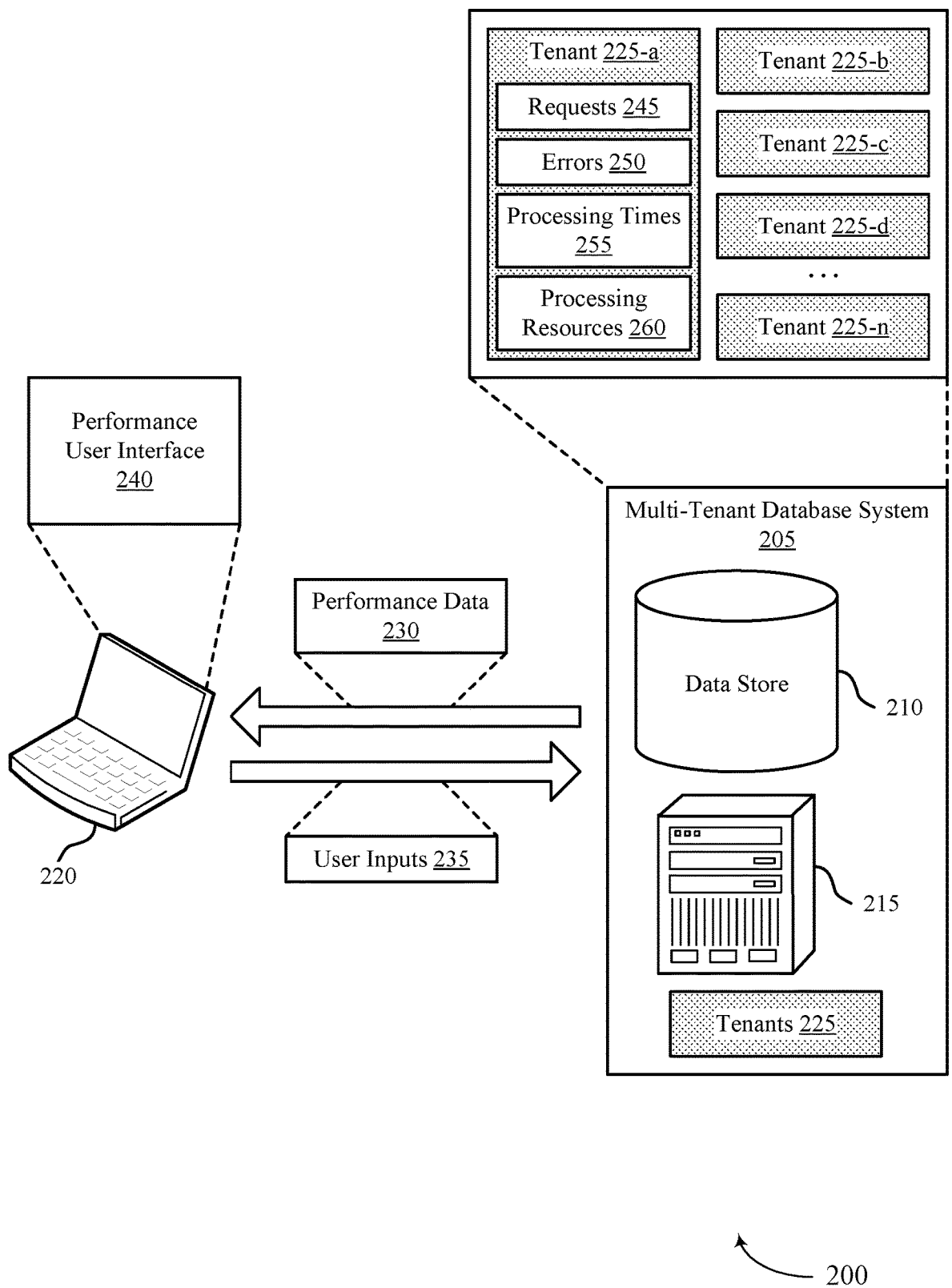
FIG. 2 illustrates an example of a data processing system that supports generating scalability scores for tenants using performance metrics in accordance with aspects of the present disclosure.

FIG. 2 illustrates an example of a data processing system 200 that supports generating scalability scores for tenants using performance metrics in accordance with aspects of the present disclosure. The data processing system 200 may be an example of a system 100 or a subsystem 125 as described with reference to FIG. 1. The data processing system 200 may include a multi-tenant database system 205 that may store and process data for multiple tenants 225. Data for different tenants 225 may be stored separately, such that users associated with one tenant 225 may be restricted from accessing data associated with a different tenant 225. A user, operating a user device 220, may send requests to the multi-tenant database system 205 to view data records, create data records, modify data records, aggregate or analyze data, or any combination thereof.

To access data in the multi-tenant database system 205, a user may have a user ID associated with a specific tenant 225 (e.g., linked to a specific tenant ID). Additionally, or alternatively, the user ID may be associated with a specific access level defining the operations that the multi-tenant database system 205 supports for the user (e.g., what data may be viewed or modified by that level of user or that specific user). The multi-tenant database system 205 may include one or more data stores 210 for storing data, one or more processing devices 215 (e.g., a database server, application server, worker server, server cluster, cloud-based resources, virtual machine, container, or any combination of these or other devices capable of processing data), or both. The multi-tenant database system 205 may be an example of a cloud platform 115, a data center 120, or a combination thereof, and the user device 220 may be an example of a cloud client 105 as described with reference to FIG. 1. The multi-tenant database system 205 may support analyzing performance data 230 for a tenant 225 at scale.

The multi-tenant database system 205 may securely store data for multiple separate tenants 225, such as a tenant 225-a, a tenant 225-b, a tenant 225-c, a tenant 225-d, up to a tenant 225-n. It is to be understood that the multi-tenant database system 205 may support any quantity of tenants 225. The multi-tenant database system 205 may store tenant-specific performance data, for example, in a set of data logs. The logs may be structured according to a database schema that supports efficient creation of logs (e.g., in response to any activities performed for a tenant 225), efficient querying of the logs (e.g., across thousands or millions of rows in the logs), or both. A data log for a tenant 225 may track (e.g., indicate) performance data 230 specific to that tenant 225. As an example, the multi-tenant database system 205 may store requests 245, errors 250, processing times 255, processing resources 260, or any combination of these or other performance parameters in the data log for the tenant 225-a. If a user of the tenant 225-a accesses the multi-tenant database system 205 (e.g., logs into the system, sends a request to the system), the multi-tenant database system 205 may capture one or more aspects of the activity in a log entry (e.g., a row of the log, with the columns of the log corresponding to specific values associated with the activity). Additionally, or alternatively, the multi-tenant database system 205 may capture information associated with integrations to the multi-tenant database system 205. For example, if an integration between the multi-tenant database system 205 and a third-party service communicates data (e.g., into the multi-tenant database system 205 or out of the multi-tenant database system 205), the multi-tenant database system 205 may capture one or more aspects of the integration activity in a log for the corresponding tenant 225.

The multi-tenant database system 205 may collect, organize, and analyze the performance metrics for a tenant 225 and present one or more results of the analysis to users of the tenant 225. For example, a user associated with the tenant 225-a and operating a user device 220 may receive performance data 230 for the tenant 225-a. One or more processing devices 215 may analyze the set of data logs on the backend to determine the performance data 230 for display in a user interface (e.g., a performance user interface 240) at the user device 220. The multi-tenant database system 205 may analyze the performance metrics for a tenant 225 such that the underlying data is secure according to one or more security policies. For example, running the performance analysis may refrain from (e.g., restrict) accessing personal identifiable information (PII) stored for a tenant 225. Additionally, or alternatively, the performance analysis may obfuscate specific underlying metrics and surface aggregate performance data 230 that does not allow a user to determine the underlying metrics contributing to the aggregate performance data if the user is restricted from viewing the specific underlying metrics (e.g., metrics associated with one or more specific users, metrics associated with one or more specific clients).

The performance data 230 may be both tenant-specific and tenant-wide. For example, the performance data 230 for the tenant 225-a may not depend on—or risk surfacing—any data from other tenants 225 of the multi-tenant database system 205. Alternatively, the performance data 230 may be generated from a complete set of data for the tenant 225-a (e.g., across multiple or all users of the tenant 225-a, across multiple or all data objects of the tenant 225-a, across multiple or all processing resources of the tenant 225-a). As such, the multi-tenant database system 205 may generate and analyze the performance data 230 at scale (e.g., running queries on massive amounts of data logs, such as thousands or millions of log entries). For example, the multi-tenant database system 205 may leverage one or more services that support queries on massive sets of data (e.g., above a threshold data size), such as Splunk queries.

The multi-tenant database system 205 may additionally include one or more safeguards to stop inefficient processing, such as a threshold quantity of queries that may be performed concurrently, a time-out value for stopping processes that take longer than a threshold time or more than a threshold amount of computing resources, or any other safeguards. In some cases, the multi-tenant database system 205 may periodically, aperiodically, upon-request, or continuously run performance analysis procedures on the logs on the backend, updating the logs used based on new activities captured in the set of data logs (e.g., in real-time or pseudo-real-time based on runtime data, design-time data, or both). In some examples, the performance data 230 may correspond to a specific time period, a specific set of errors 250, or some other filter. For example, the multi-tenant database system 205 may determine a time frame for analysis, and the processing devices 215 may calculate the one or more aggregate performance metrics based on a subset of the performance data 230 associated with activities performed during the time frame.

Additionally, or alternatively, the processing devices 215 may determine tenant-agnostic performance data across multiple tenants 225. Such performance data 230 may support insights into pre-configured code, data objects, processes, or a combination thereof defined by the multi-tenant database system 205 for use by any tenant 225. The tenant-agnostic performance data may be viewed and analyzed by users (e.g., administrative users) associated with the multi-tenant database system 205, as opposed to users associated with any one tenant 225.

The multi-tenant database system 205 may send the performance data 230 for display by the user device 220 in a performance user interface 240. In some examples, the performance user interface 240 may present the performance data 230 on a timeline, in a pie chart, in a bar graph, or in any other display configuration. The performance user interface 240 may allow a user of the user device 220 to view the performance data 230 and dig into specific aspects of the performance data 230. For example, the user may use one or more user inputs 235 to the performance user interface 240 to view specific performance data 230, analyze specific performance data 230, or perform other operations associated with performance analysis at scale for a tenant 225.

As described herein, the multi-tenant database system 205 may support aggregating performance metrics of multi-tenant complex systems into scalability scores for individual tenants 225. For example, the processing devices 215 may correspond to or otherwise support various tools a user (e.g., a marketer, a sales associate) may use to capture tenant-specific observability data in a multi-tenant system, such as the multi-tenant database system 205 (e.g., a sales service, a CRM service). The observability data may include the performance data 230, such as basic metrics, logs, database transactions, user requests, distributed traces, and profiling data, or any other data captured from different layers of the multi-tenant database system 205 (e.g., development, production, implementation). In some examples, the performance data 230 may be collected for multiple tenants 225 in the multi-tenant database system 205 and may include performance metrics for elements belonging to individual tenants 225.

The processing devices 215 may use the data (e.g., the performance data 230 in the data store 210) to identify one or more performance bottlenecks associated with an integration. An integration may include bulk data loading, a bulk data transfer, a bi-directional integration between the multi-tenant database system 205 and an external system (e.g., data flowing from the multi-tenant database system 205 into the external system or into the multi-tenant database system 205 from the external system), or any combination thereof. In addition, an integration category may include an API and an architecture associated with an application.

Based on identifying the one or more performance bottlenecks (e.g., based on the performance data 230), the processing devices 215 may create insights describing a performance bottleneck, a reason for the performance bottleneck, a recommended corrective action the user may perform to reduce the effect of the performance bottleneck, or any combination thereof. In some examples, a recommended corrective action may include sorting a set of data logs, disabling one or more conflicting integrations, migrating a set of data logs to a particular data store, using batch processing, updating a runtime, or any combination thereof. The processing devices 215 may display the insights and relevant performance data 230 to a user via the performance user interface 240 (e.g., in a mobile application, in a desktop application). The performance data 230 may include data collected from the integration such as metrics, traces, anomalies, performance test results, or any other data. In addition, the performance data 230 may generate the insights based on performance data 230 collected for a relatively long period of time (e.g., end user logs collected for seven days, such as the past seven days with a rolling time window). As such, the processing devices 215 may use relatively large amounts of various types of data to generate the insights (e.g., thousands or millions of rows of a data log).

The processing devices 215 may aggregate the performance data 230 corresponding to a tenant 225 and determine scalability scores for the tenant 225. That is, in addition to providing insights and recommended corrective actions, the processing devices 215 may provide a scalability score describing the overall health (e.g., performance) of a tenant's integrations, applications, code, processes, or any other aspects of the tenant's system. The processing devices 215 may further determine and indicate how much the performance of a tenant may improve if a user performs a specific action or update (e.g., to fix an issue of scale that may have triggered the insight). For example, the processing devices 215 may determine ten different insights associated with the performance data 230 collected for the implementation. To determine which of the ten different insights has the greatest impact on the implementation (e.g., which insight contributed the most to the scalability score in a negative way, which insight may be improved the most), the processing devices 215 may provide the scalability score for the implementation, an amount (e.g., a percentage) by which the scalability score may increase if the insight is fixed (e.g., if a specific corrective action is taken), a severity level or a criticality associated with fixing that insight (e.g., how much an improvement may impact the overall scalability score of the tenant), the corrective actions the user may perform to enact that improvement, or any combination thereof.

In some examples, the aggregated performance metrics used to determine the scalability scores for individual tenants 225 may be independent from the performance metrics used to provide insights. That is, the scalability scores may be based on multiple aspects of an implementation (e.g., an entire implementation) rather than a specific insight. For example, the user may receive a scalability score of 91% for an implementation corresponding to an individual tenant 225. To achieve a scalability score closer to 100%, the user may act on specific insights identified by the processing devices 215 that may have negatively impacted the scalability score. In addition to the scalability score corresponding to the implementation, the processing devices 215 may provide a percentage corresponding to a specific insight representing by what percent the scalability score may increase if that insight is mitigated. As such, the user may perform a recommended corrective action tied to a specific insight to improve the overall scalability score of the implementation for a tenant 225.

In addition, the processing devices 215 may update the scalability score based on changes to the performance data 230. For example, the processing devices may calculate one or more updated aggregate performance metrics for a tenant 225 based on updated performance data for the tenant 225, the updated aggregate performance metrics based on design time data for the tenant 225, runtime data for the tenant 225, or both. The processing devices may perform an additional comparison of the updated aggregate performance metrics to the one or more performance thresholds and may generate one or more updated scalability scores corresponding to the updated aggregate performance metrics. As such, a scalability score may change as the multi-tenant database system receives and stores additional data logs.

A scalability score may represent an aggregated performance score for a particular tenant 225. In some examples, the processing devices 215 may calculate the scalability score based on an end-user experience, backend processing, or both. For example, an end user may experience short or long request times, which may impact the overall scalability score of the implementation. Other examples of factors that may impact scalability scores include central processing unit (CPU) resource consumption, errors associated with an implementation, loading times of different page views and reports, overhead resource consumption (e.g., time to process a request), and any other factors.

In some examples, a threshold scalability score (e.g., a highest achievable scalability score of 100%) may be based on a set of threshold performance metrics. The set of threshold performance metrics may correspond to one or more resource usage thresholds, one or more latency thresholds, one or more error thresholds, or a combination thereof. For example, the threshold performance metrics may indicate a less than 15% database CPU consumption, a less than 15% application CPU consumption, a 0% error rate (e.g., in the last week or month), optimal loading of page views and reports (e.g., a less than 1 second load time), or any combination of these or other threshold performance metrics that support "best practices" of the multi-tenant database system 205 (e.g., as defined by the host of the multi-tenant database system 205). In some examples, such threshold performance metrics may change based on new policies, industry standards, database technologies, user preferences, or any combination thereof. That is, the processing devices 215 may receive an updated performance threshold and update the one or more performance thresholds defined for the tenants 225 in response to the updated performance threshold.

If an implementation satisfies each threshold performance metric, then the implementation may receive a highest possible scalability score (e.g., 100%). If the implementation fails to satisfy any of the threshold performance metrics, then the scalability score may be lower than the highest possible scalability score. That is, the processing devices 215 may determine a lower score for an implementation which may be caused by various performance bottlenecks indicated to the user as insights. The user may perform a recommended corrective action to mitigate the insights and improve the overall scalability score of the implementation. The processing devices 215 may aggregate performance metrics and calculate scalability scores on the backend over long periods of time (e.g., continuously, periodically, or aperiodically). In some examples, the scalability score may be represented by a percentage, on an integer scale (e.g., 0 to 5), as a category (e.g., poor or good implementation), or as any other representation.

The multi-tenant database system 205 may analyze metrics associated with requests 245, errors 250, processing times 255, processing resources 260, or other information relating to processes scaling under load for a tenant 225-a. For example, the multi-tenant database system 205 may analyze design time data (e.g., code designed for the tenant 225-a, a custom configuration for data objects designed for the tenant 225-a, design time errors 250), runtime data (e.g., the processing times 255, processing resources 260, runtime errors 250), or both. In some cases, the multi-tenant database system 205 may use the metrics to determine historical patterns or preferences specific to a tenant 225-a. For example, the multi-tenant database system 205 may determine the types of operations performed most often by the tenant 225-a, times of day when the tenant 225-a is most active (e.g., when users of the tenant 225-a are performing a majority of requests 245 for the tenant 225-a), or other tenant-specific metrics. Additionally, or alternatively, the multi-tenant database system 205 may determine an integration, an application, a user, a data object, a process flow, or some other aspect associated with the tenant 225-a that contributes relatively more towards inefficiencies of scale. The multi-tenant database system 205 may analyze improvements specific to the integration, application, user, data object, process flow, or other aspect. For example, the multi-tenant database system 205 may automatically rollback an update to the tenant 225-a if the update (e.g., a new integration, an update to an application, a custom feature or custom data object) contributes above a threshold amount towards an inefficiency of scale.

In some examples, the tenant 225-*a* may support a bulk operation that operates on a set of data including a relatively large quantity of data objects (e.g., above a data object threshold). However, such a bulk operation may row lock or table lock the relatively large quantity of data objects concurrently for an extended time period (e.g., longer than a threshold time period) while the bulk operation is updating the set of data. Such a bulk operation may result in one or more row lock errors (e.g., errors 250) if other transactions are performed during the bulk operation on data in the set of data. Such a potential for row lock errors may decrease a scalability score for the tenant 225-*a* (e.g., a scalability score associated with this specific type of bulk operation). In some cases, the multi-tenant database system 205 may recommend an improved batch process for performing the bulk operation, such that data objects affected by the bulk operation are not locked at the same time, are locked for a relatively shorter portion of the bulk operation, or both. In some examples, the multi-tenant database system 205 may implement the batch process (e.g., automatically or based on a user input 235) to improve the scalability of the bulk operation. For example, the multi-tenant database system 205 may determine a quantity of data objects to use in batches for batch processing of the bulk operation, and the multi-tenant database system 205 may perform the bulk operation on one batch at a time. Accordingly, a relatively small subset of the set of data (e.g., the data objects corresponding to a specific batch) may be locked at any given time, and these data objects may be unlocked when updating is complete for the batch, not for the entire set of data, significantly reducing the amount of time that any one data object is locked during the bulk operation. The multi-tenant database system 205 may automatically identify operations that may benefit from batch processing (e.g., based on analysis of the code, analysis of the processing resource usage, analysis of locked resources) and may automatically implement batch processing for the identified operations to improve the scalability score for the tenant 225-*a*. In some cases, the multi-tenant database system 205 may perform the batch processing transparent to the tenant 225-*a*.

Additionally, or alternatively, the tenant 225-*a* may support a transaction that modifies one or more data objects in the data store 210. For example, the tenant 225-*a* may create or install an application that executes the transaction at the data store 210. If a relatively small quantity of these transactions is performed for the tenant 225-*a* (e.g., less than a threshold quantity), the data store 210 may support performing the transactions. However, if the tenant 225-*a* operates at scale for enough users, such that the quantity of these transactions exceeds the threshold quantity, the data store 210 may potentially encounter row lock errors (e.g., errors 250). For example, if a first transaction is executed at the data store 210 on a first row, the data store 210 may lock the first row for a short time period during execution of the transaction. As the scale of the tenant 225-*a* increases, the likelihood that another transaction attempts to modify the first row during this short time period increases. As such, a second transaction may attempt to modify the first row while the first row is locked, resulting in a row lock error (e.g., and a failed execution of the transaction or an increased latency associated with executing the transaction). Such a potential for row lock errors may decrease a scalability score for the tenant 225-*a* (e.g., a scalability score associated with this specific type of transaction).

In some cases, the multi-tenant database system 205 may recommend a modification to the code for the transaction or the application performing the transaction to reduce the likelihood of row lock errors. For example, the multi-tenant database system 205 may identify that the portion of the code executing the transaction may be performed as an async job to reduce the likelihood of multiple transactions occurring concurrently for the same data object. In some examples, the multi-tenant database system 205 may send, for display at the user device 220, a suggested update to the code to improve the scalability for the tenant 225-*a*. In some other examples, the multi-tenant database system 205 may automatically switch a portion of code to be performed as an async job to improve the scalability.

In some other cases, the multi-tenant database system 205 may recommend a reorganization of data in the data store 210 to reduce the likelihood of row lock errors. In some examples, the multi-tenant database system 205 may automatically perform the reorganization of the data for the tenant 225-*a* at the data store 210 (e.g., an update to a database schema for the multi-tenant database system 205) to improve the scalability of the tenant 225-*a*. For example, a tenant 225-*a* may add multiple custom fields to a first data object to store information relating to the first data object. However, multiple different transactions may affect one or more of these custom fields, resulting in row lock errors for the first data object. The multi-tenant database system 205 may recommend using a second, separate data object to store one or more of these custom fields, where this second data object includes a reference to the corresponding first data object.

Such a reorganization of the data may improve scalability of the tenant 225-*a*, for example, if the data store 210 handles a massive quantity of transactions (e.g., above a threshold quantity of transactions) updating one or more fields associated with the data objects. In some other examples, however, using two data objects rather than one data object may reduce the scalability of a tenant (e.g., increasing latency for some search operations). The multi-tenant database system 205 may determine, on a tenant-by-tenant basis, a recommendation to improve scalability, where the recommendation to improve scalability for one tenant 225-*a* may fail to improve scalability for a second tenant 225-*b* based on one or more tenant-specific configurations, processes, applications, data use cases, frequencies of transactions, quantities of users, quantities of data objects, or any combination thereof. For example, operations that may improve the scalability of a first tenant 225-*a* with a relatively large quantity of users, each with relatively small data sets in the data store 210, may be different from operations that may improve the scalability of a second tenant 225-*b* with a relatively small quantity of users, each with relatively large data sets in the data store 210. Similarly, operations that may improve the scalability of a first tenant 225-*a* that performs mostly search functions in the data store 210 (e.g., greater than a threshold proportion of processes executed for the first tenant 225-*a* are search functions) may be different from operations that may improve the scalability of a second tenant 225-*b* that performs mostly insert and aggregation functions.

The multi-tenant database system 205 may use information derived from one tenant 225-*b* to improve the scalability for another tenant 225-*a* if the improvement obfuscates any tenant-specific information. For example, the multi-tenant database system 205 may identify a portion of code or an order of performing processes used by the tenant 225-*b* that contributes positively towards the scalability score for the tenant 225-*b*. The multi-tenant database system 205 may recommend similar code or a similar order of performing processes to the tenant 225-*a* to improve the scalability score for the tenant 225-*a*, for example, if the recommendation does not compromise any protected data or information for the tenant 225-*b*. As such, the multi-tenant database system 205 may leverage the differences between tenants to determine tenant-specific updates to improve scalability.

The individual tenants 225 in the multi-tenant database system 205 may use different components (e.g., of the multi-tenant database system 205), and therefore the scalability scores may vary for each tenant 225 based on the components used. In some examples, the multi-tenant database system 205 may determine the threshold performance metrics that are used for each tenant 225 such that the tenants 225 may be directly compared and contrasted (e.g., by comparing their scalability scores). As such, the processing devices 215 may provide a unified view across multiple tenants 225 to determine best practices, areas for improvement, and other enhancements for individual or multiple tenants 225. For example, the processing devices 215 may calculate, for the tenant 225-*b* (e.g., a second tenant), one or more second aggregate performance metrics based on performance data for the tenant 225-*b* stored in a second subset of the set of data logs, where the second aggregate performance metrics may be based on design time data for the tenant 225-*b*, runtime data for the second tenant 225-*b*, or both. The processing devices 215 may compare the second aggregate performance metrics to the one or more performance thresholds defined for the tenants 225, and the processing devices 215 may generate one or more second scalability scores corresponding to the second aggregate performance metrics for the tenant 225-*b* based on the comparison.

Using the aggregated performance metrics from multiple tenants 225 may enable the processing devices 215 to provide accurate performance and scale analysis of a tenant 225 (e.g., a customer implementation). In addition, the processing devices 215 may provide an accurate performance failure analysis. For example, the scalability scores may display how an overall health of an implementation may or may not be impacted by poor coding practices or other features corresponding to the backend development of the implementation. By displaying the scalability scores for individual tenants 225 based on aggregated performance metrics of multi-tenant systems, the processing devices 215 may provide a standard method to compare and contrast various tenants 225 (e.g., customers) from a performance perspective.

Figure 3:
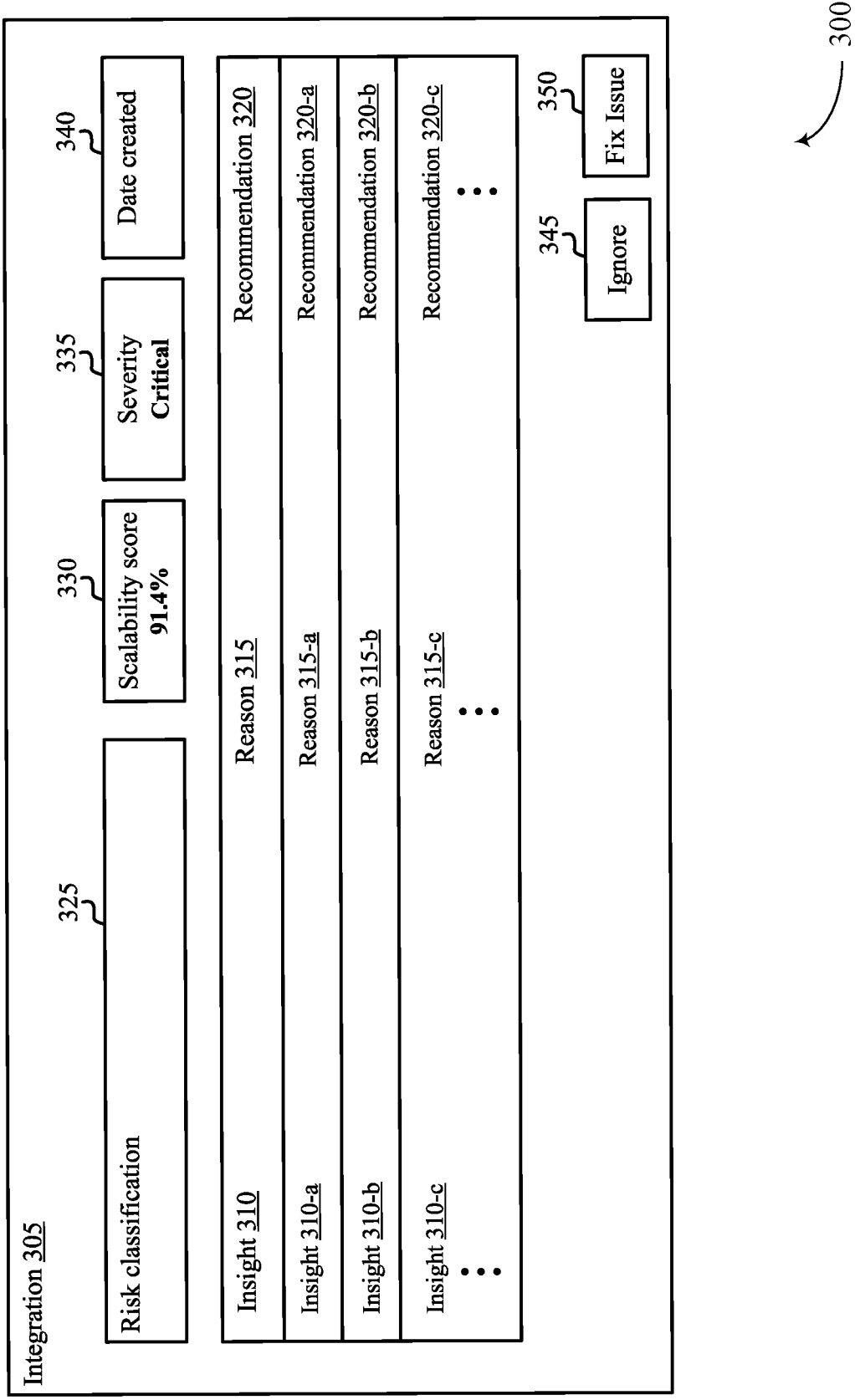
FIG. 3 illustrates an example of a user interface that supports generating scalability scores for tenants using performance metrics in accordance with aspects of the present disclosure.

FIG. 3 illustrates an example of a user interface 300 that supports generating scalability scores for tenants using performance metrics in accordance with aspects of the present disclosure. The user interface 300 may be implemented by the multi-tenant database system 205 described herein with reference to FIG. 2, and may support aggregating performance metrics of multi-tenant, complex systems into scalability scores for individual tenants. For example, the user interface 300 may be displayed as part of a performance user interface 240 described herein with reference to FIG. 2. The user interface 300 may provide a list of insights 310 (e.g., that describe performance bottlenecks) based on performance data associated with an integration 305 (e.g., an application, a product). For each insight 310, the user interface 300 may display a reason 315 for the insight 310 and a recommendation 320 of a corrective action the user may perform to reduce the effect of the insight 310. In addition, the user interface 300 may indicate a risk classification 325, a scalability score 330, a severity 335 (e.g., a severity level or criticality), a date created field 340, or a combination thereof. The user interface 300 may be an example user interface for presenting such information to a user. Additional, or alternative, user interface configurations may be implemented to support similar displays, functionality, or both.

In some examples, the insights 310 may be associated with a particular integration 305 (e.g., an implementation). For example, the insights 310 may correspond to an account update, an opportunity insert, a team allocation, new work created by month, or any other integration 305 or implementation associated with a set of tenants of a multi-tenant database system. An insight 310 may correspond to a performance metric of one or more aggregate performance metrics based on design time data for a tenant, runtime data for the tenant, or both. As such, a given insight 310 may, at least in part, contribute to a scalability score 330 associated with the integration 305.

In some cases, a reason 315 may indicate why a corresponding insight 310 may have occurred. In addition, a recommendation 320 may indicate one or more suggested actions a user may perform to change the scalability score 330. In some examples, a multi-tenant database system may predict a change to the scalability score 330 based on a change to code for a particular tenant, a change to a process of the tenant, or a combination thereof. The multi-tenant database system may then send, for display at the user interface 300, a suggested action corresponding to the change to the code, the change to the process, of the combination thereof, and an indication of the predicted change to the scalability score 330 corresponding to the suggested action. In some examples, the user (e.g., via the multi-tenant database system) may automatically perform the suggested action for an associated tenant based on the predicted change to the scalability score 330 corresponding to the suggested action. For example, if the predicted change is determined to be significant (e.g., as compared to a threshold), the suggested action may be automatically implemented.

For example, for an integration 305 associated with an account update, an insight 310-*a* may indicate a bulk API data load that may block urgent deployment work. The insight 310-*a* may correspond to a reason 315-*a* indicating one or more record lock (e.g., row lock) errors associated with the bulk API data load. In addition, a recommendation 320-*a* associated with the insight 310-*a* and the reason 315-*a* may indicate corrective actions the user may perform to reduce the record lock errors, which may include sorting data records, disabling conflicting integrations (e.g., other integrations that may conflict with the integration 305), or both.

Additionally, or alternatively, the integration 305 may be associated with an insight 310-*b*, which may indicate that bulk data load jobs reached a limit. A reason 315-*b* associated with the insight 310-*b* may indicate that the limits were reached because a low batch size was used. Accordingly, a recommendation 320-*b* for improving the insight 310-*b* may indicate corrective actions such as using more efficient batch sizes, moving to a different bulk data load procedure (e.g., bulk V2), or both. In some cases, the integration 305 may additionally be associated with an insight 310-*c*, which may indicate an occurrence of slow bulk data loads and batch jobs. A reason 315-*c* associated with the insight 310-*c* may indicate that it may have taken too much time (e.g., 70 hours) to complete the slow bulk data loads and batch jobs in a sandbox environment. In addition, a recommendation 320-c for improving the insight 310-c may indicate corrective actions such as using operators such as "equals" or "contains," optimizing a batch job for faster execution, or both.

In some examples, the user interface 300 may display the scalability score 330, which may be based on one or more of the insights 310. For example, a multi-tenant database system may compare the insights 310 (e.g., one or more aggregate performance metrics) to one or more performance thresholds defined for multiple tenants of the multi-tenant database system. Based on the comparison, the multi-tenant database system may generate the scalability score 330 indicating the current overall performance of the integration 305 when compared to the one or more performance thresholds. The scalability score 330 may be displayed as a percentage (e.g., 91.4%), a numerical value (e.g., 4 out of 5), a category, or the like. In addition, the severity 335 may indicate a criticality of performing a suggested action of a recommendation 320. For example, the severity 335 may indicate that it is critical for the user to perform the suggested action, or the severity 335 may indicate a warning, or that performing the suggested action is not critical, among other indications of severity.

As described herein, the user interface 300 may indicate whether the scalability score 330 may improve if the user follows a recommendation 320. For example, if the user performs a suggested action based on the recommendation 320-a (e.g., if the user "fixes" the issue associated with the insight 310-a by sorting data records), the scalability score may improve by 3.0%. Accordingly, the user may understand how the scalability score 330 may be impacted by specific insights 310 (e.g., based on multiple aspects of the integration 305).

In some examples, the risk classification 325 may indicate how many data logs (e.g., data records) of a set of data logs are associated with a given insight 310 for the integration 305. Specifically, the risk classification 325 may indicate a quantity of data logs corresponding to one or more aggregate performance metrics that fail to satisfy one or more performance thresholds. For example, if the integration 305 is associated with an account update, the risk classification 325 may indicate that out of 2,000 account record updates, 75 records encountered row lock errors (e.g., corresponding to the insight 310-a). Additionally, the user interface 300 may indicate a date created field 340 indicating a date and a time at which the scalability score 330 was generated.

A user may choose to ignore or fix an issue associated with the insight 310. For example, the user may select an ignore button 345 via the user interface 300, which may indicate that the user is refraining from following a recommendation 320 for a particular insight 310. Alternatively, the user may select a fix issue button 350, which may indicate that the system is to perform a corrective action following a recommendation 320 to mitigate issues associated with an insight 310.

Figure 4:
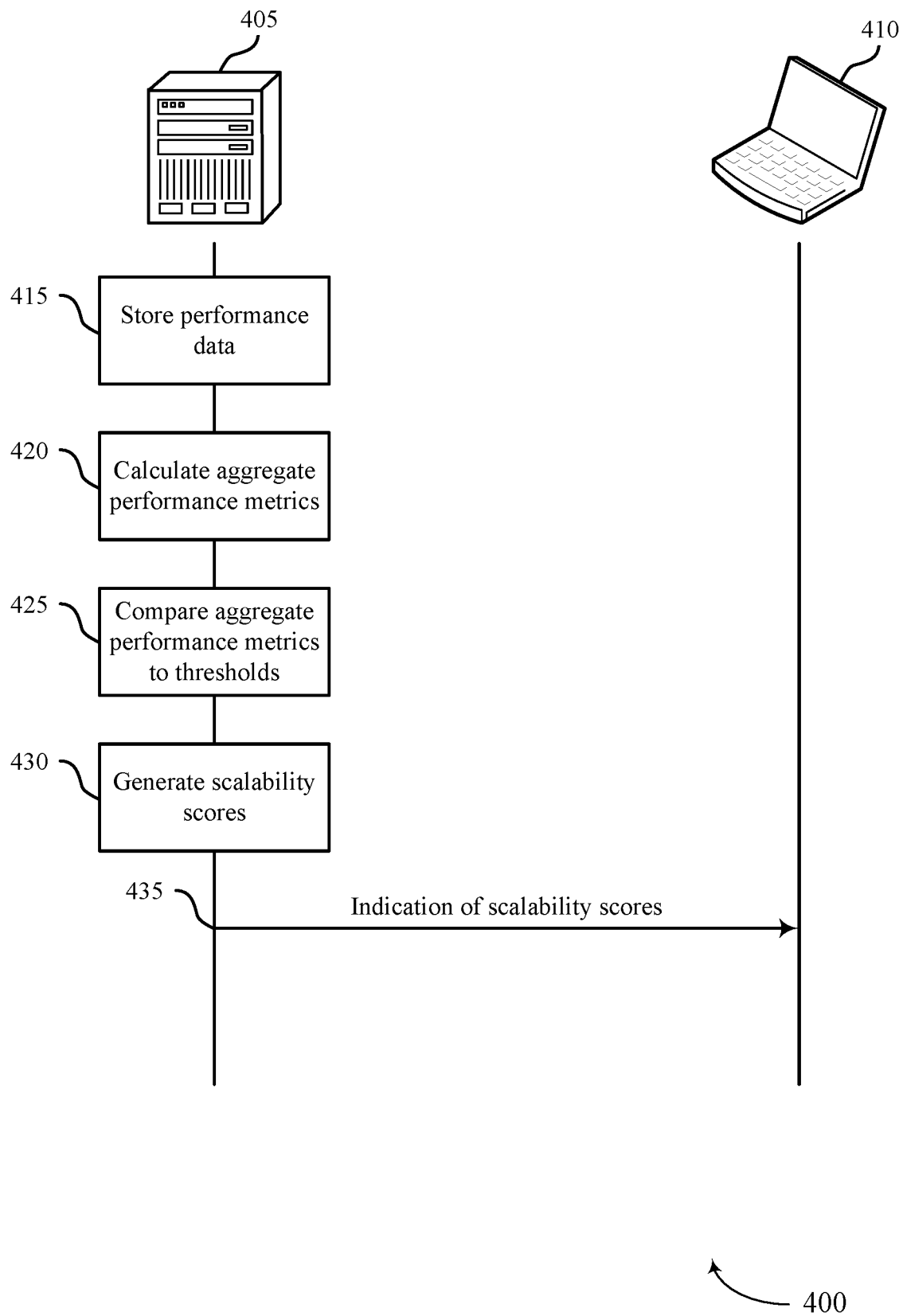
FIG. 4 illustrates an example of a process flow that supports generating scalability scores for tenants using performance metrics in accordance with aspects of the present disclosure.

FIG. 4 illustrates an example of a process flow 400 that supports generating scalability scores for tenants using performance metrics in accordance with aspects of the present disclosure. The process flow 400 may implement aspects of the system 200 or may be implemented by aspects of the system 200. The process flow 400 may include a multi-tenant database system 405 and a user device 410. In the following description of the process flow 400, the operations between the multi-tenant database system 405 and the user device 410 may be performed in different orders or at different times. Some operations may also be left out of the process flow 400 or other operations may be added.

Although the multi-tenant database system 405 and the user device 410 are shown performing the operations of the process flow 400, some aspects of some operations may be performed by one or more other devices.

At 415, the multi-tenant database system 405 may store a set of data logs indicating performance data for multiple tenants of the multi-tenant database system 405. The performance data may include basic metrics, logs, database transactions, user requests, distributed traces, and profiling data, or any other data captured from different layers of the multi-tenant database system 405.

At 420, the multi-tenant database system 405 may calculate, for a tenant of the multiple tenants, one or more aggregate performance metrics based on performance data for the tenant stored in a subset of the set of data logs (e.g., the subset corresponding to the tenant-specific logs for that tenant), a performance metric of the one or more aggregate performance metrics based on design time data for the tenant, runtime data for the tenant, or both.

At 425, the multi-tenant database system 405 may compare the one or more aggregate performance metrics to one or more performance thresholds defined for the tenants (e.g., common across tenants) at the multi-tenant database system.

At 430, the multi-tenant database system 405 may generate one or more scalability scores corresponding to the one or more aggregate performance metrics for the tenant based on the comparing. In some examples, the scalability scores may represent the overall performance of a tenant (e.g., for a specific activity or process).

At 435, the multi-tenant database system 405 may send, for display at a user interface of the user device 410, an indication of the one or more scalability scores, the user device operated by a user associated with the tenant. The user device 410 may display the one or more scalability scores in an interactive user interface, such that a user may dig into aspects of the one or more scalability scores using the user interface.

Figure 5:
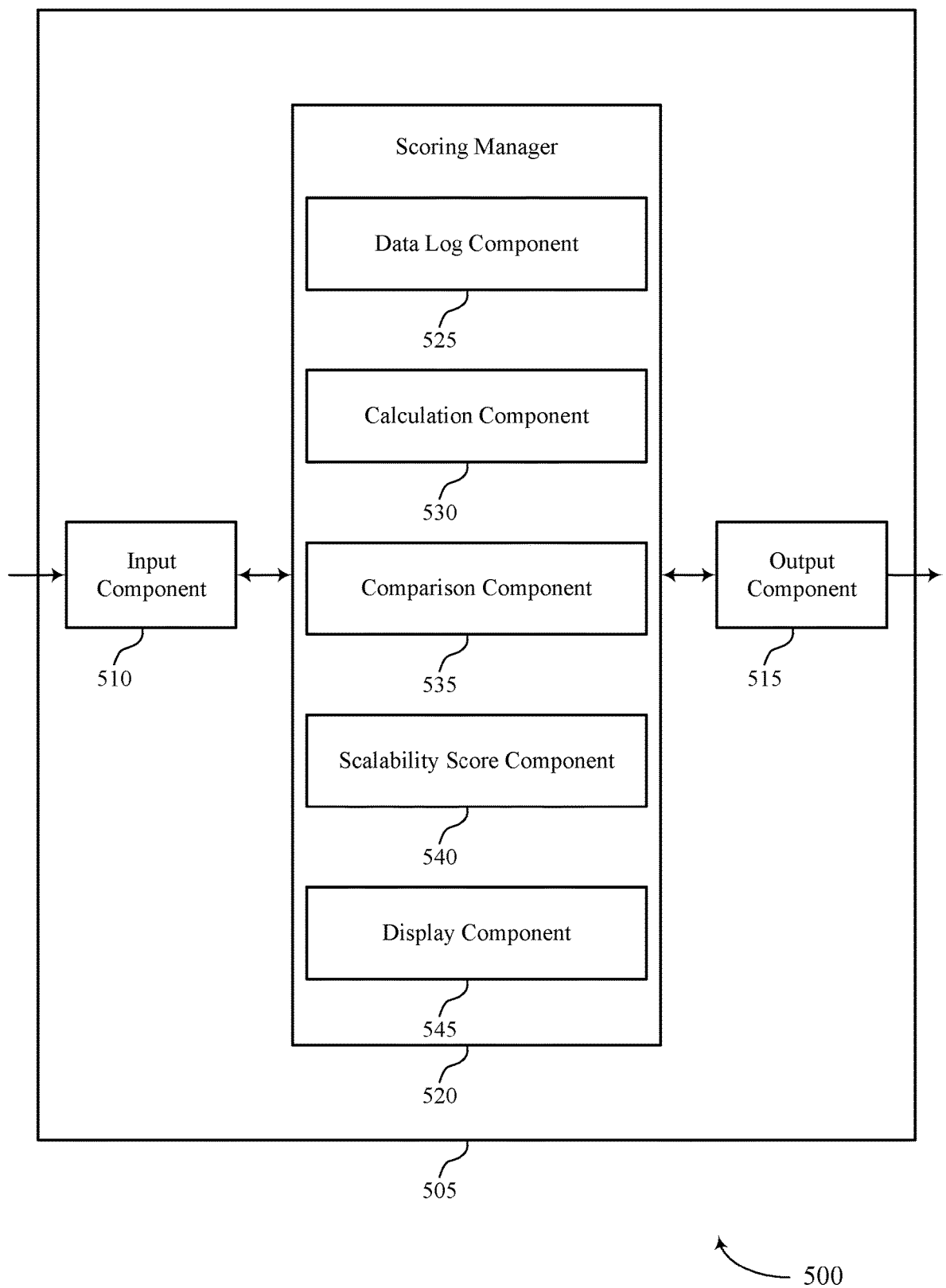
FIG. 5 shows a block diagram of a device that supports generating scalability scores for tenants using performance metrics in accordance with aspects of the present disclosure.

FIG. 5 shows a block diagram 500 of a device 505 that supports generating scalability scores for tenants using performance metrics in accordance with aspects of the present disclosure. The device 505 may include an input component 510, an output component 515, and a scoring manager 520. The device 505 may also include a processor. Each of these components may be in communication with one another (e.g., via one or more buses).

The input component 510 may manage input signals for the device 505. For example, the input component 510 may identify input signals based on an interaction with a modem, a keyboard, a mouse, a touchscreen, or a similar device. These input signals may be associated with user input or processing at other components or devices. In some cases, the input component 510 may utilize an operating system such as iOS®, ANDROID®, MS-DOS®, MS-WINDOWS®, OS/2®, UNIX®, LINUX®, or another known operating system to handle input signals. The input component 510 may send aspects of these input signals to other components of the device 505 for processing. For example, the input component 510 may transmit input signals to the scoring manager 520 to support generating scalability scores for tenants using performance metrics. In some cases, the input component 510 may be a component of an input/output (I/O) controller 710 as described with reference to FIG. 7.

The output component 515 may manage output signals for the device 505. For example, the output component 515 may receive signals from other components of the device 505, such as the scoring manager 520, and may transmit these signals to other components or devices. In some examples, the output component 515 may transmit output signals for display in a user interface, for storage in a database or data store, for further processing at a server or server cluster, or for any other processes at any number of devices or systems. In some cases, the output component 515 may be a component of an I/O controller 710 as described with reference to FIG. 7.

For example, the scoring manager 520 may include a data log component 525, a calculation component 530, a comparison component 535, a scalability score component 540, a display component 545, or any combination thereof. In some examples, the scoring manager 520, or various components thereof, may be configured to perform various operations (e.g., receiving, monitoring, transmitting) using or otherwise in cooperation with the input component 510, the output component 515, or both. For example, the scoring manager 520 may receive information from the input component 510, send information to the output component 515, or be integrated in combination with the input component 510, the output component 515, or both to receive information, transmit information, or perform various other operations as described herein.

The scoring manager 520 may support generating scalability scores for tenants at a multi-tenant database system in accordance with examples as disclosed herein. The data log component 525 may be configured to support storing a set of data logs indicating performance data for a set of multiple tenants of the multi-tenant database system. The calculation component 530 may be configured to support calculating, for a tenant of the set of multiple tenants, one or more aggregate performance metrics based on performance data for the tenant stored in a subset of the set of data logs, where a performance metric of the one or more aggregate performance metrics is based on design time data for the tenant, runtime data for the tenant, or both. The comparison component 535 may be configured to support comparing the one or more aggregate performance metrics to one or more performance thresholds defined for the set of multiple tenants at the multi-tenant database system. The scalability score component 540 may be configured to support generating one or more scalability scores corresponding to the one or more aggregate performance metrics for the tenant based on the comparing. The display component 545 may be configured to support sending, for display at a user interface of a user device, an indication of the one or more scalability scores, the user device operated by a user associated with the tenant.

In some examples, the data log component 525, the calculation component 530, the comparison component 535, the scalability score component 540, the display component 545, or any combination thereof may use one or more thresholds to support performing the operations described herein. For example, a component may store a threshold value or may be configured with a threshold value for triggering an operation. In some examples, the scoring manager 520 may store, track, update, or otherwise use one or more performance thresholds that may be tenant-specific or may be associated with any tenants of the multi-tenant database system. A performance threshold may indicate a level of performance for a tenant to exceed, a level of performance below which the scoring manager 520 may recommend one or more corrective actions, a level of performance defined as a "performance bottleneck" or an "inefficiency of scale," or any combination thereof. In some examples, the performance threshold may be associated with any performance metric for a tenant, such as a threshold quantity of processing resources used for a procedure, a threshold quantity of memory resources used for the procedure, a threshold processing latency associated with executing the procedure, a threshold quantity of errors encountered for the procedure, or any combination of these or other performance thresholds. Additionally, or alternatively, the component may use another trigger (e.g., a trigger function) or trigger state (e.g., instead of one or more thresholds) to trigger an operation.

Figure 6:
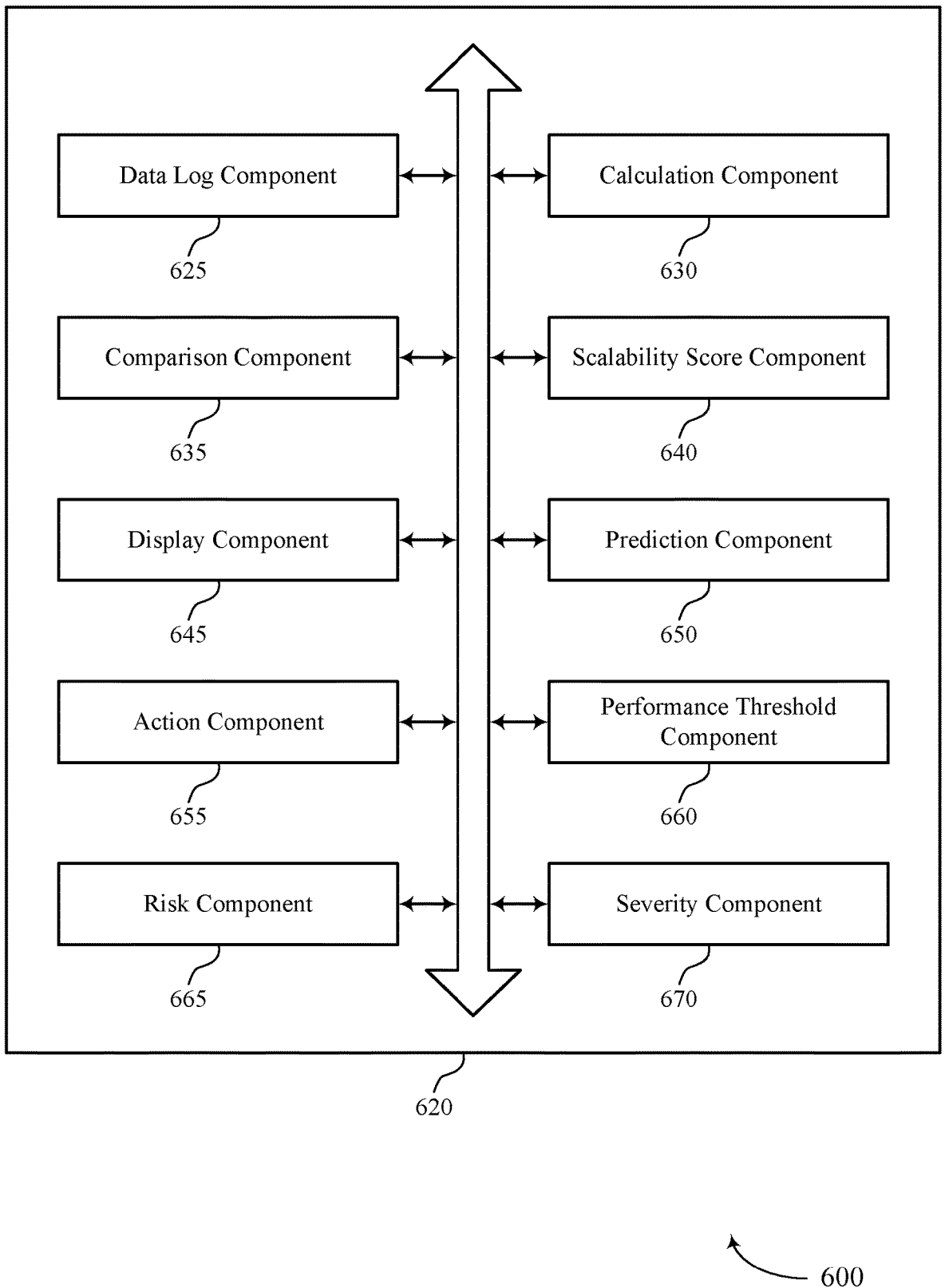
FIG. 6 shows a block diagram of a scoring manager that supports generating scalability scores for tenants using performance metrics in accordance with aspects of the present disclosure.

FIG. 6 shows a block diagram 600 of a scoring manager 620 that supports generating scalability scores for tenants using performance metrics in accordance with aspects of the present disclosure. The scoring manager 620 may be an example of aspects of a scoring manager or a scoring manager 520, or both, as described herein. In some examples, the scoring manager 620, or various components thereof, may support performing various aspects of generating scalability scores for tenants using performance metrics as described herein. For example, the scoring manager 620 may include a data log component 625, a calculation component 630, a comparison component 635, a scalability score component 640, a display component 645, a prediction component 650, an action component 655, a performance threshold component 660, a risk component 665, a severity component 670, or any combination thereof. Each of these components may communicate, directly or indirectly, with one another (e.g., via one or more buses).

The scoring manager 620 may support generating scalability scores for tenants at a multi-tenant database system in accordance with examples as disclosed herein. The data log component 625 may be configured to support storing a set of data logs indicating performance data for a set of multiple tenants of the multi-tenant database system. The calculation component 630 may be configured to support calculating, for a tenant of the set of multiple tenants, one or more aggregate performance metrics based on performance data for the tenant stored in a subset of the set of data logs, where a performance metric of the one or more aggregate performance metrics is based on design time data for the tenant, runtime data for the tenant, or both. The comparison component 635 may be configured to support comparing the one or more aggregate performance metrics to one or more performance thresholds defined for the set of multiple tenants at the multi-tenant database system. The scalability score component 640 may be configured to support generating one or more scalability scores corresponding to the one or more aggregate performance metrics for the tenant based on the comparing. The display component 645 may be configured to support sending, for display at a user interface of a user device, an indication of the one or more scalability scores, the user device operated by a user associated with the tenant.

In some examples, the prediction component 650 may be configured to support predicting a change to a scalability score of the one or more scalability scores based on a change to code for the tenant, a change to a process of the tenant, or a combination thereof. In some examples, the action component 655 may be configured to support sending, for display at the user interface of the user device, a suggested action corresponding to the change to the code, the change to the process, or the combination thereof and an indication of the predicted change to the scalability score corresponding to the suggested action.

In some examples, the severity component 670 may be configured to support determining a severity level associated with the scalability score, the severity level indicating a criticality of performing the suggested action. In some examples, the severity component 670 may be configured to support sending, for display at the user interface of the user device, an indication of the severity level.

In some examples, the action component 655 may be configured to support automatically performing the suggested action for the tenant based on the predicted change to the scalability score corresponding to the suggested action. In some examples, the suggested action includes sorting the set of data logs, disabling one or more conflicting integrations, migrating the set of data logs to a data store, using batch processing, updating a runtime, or any combination thereof.

In some examples, the prediction component 650 may be configured to support predicting a change to a scalability score of the one or more scalability scores based on an update to code for the tenant, an update to a process of the tenant, or a combination thereof. In some examples, the action component 655 may be configured to support rolling back the update to the code for the tenant, the update to the process of the tenant, or a combination thereof based on the predicted change to the scalability score.

In some examples, the action component 655 may be configured to support modifying an execution of code comprising a transaction for the multi-tenant database system based on a scalability score of the one or more scalability scores. In some examples, the action component 655 may be configured to support performing the transaction as an asynchronous job, a batch job, or both based on the modified execution of the code.

In some examples, the action component 655 may be configured to support updating a database schema for the multi-tenant database system based a scalability score of the one or more scalability scores.

In some examples, the performance threshold component 660 may be configured to support determining a tenant-specific process performed for the tenant based at least in part on the one or more aggregate performance metrics. In some examples, the display component 645 may be configured to support sending, for display at the user interface of the user device, a suggested action based on the tenant-specific process and a scalability score of the one or more scalability scores.

In some examples, the calculation component 630 may be configured to support calculating, for a second tenant of the set of multiple tenants, one or more second aggregate performance metrics based on performance data for the second tenant stored in a second subset of the set of data logs, where a second performance metric of the one or more second aggregate performance metrics is based on design time data for the second tenant, runtime data for the second tenant, or both. In some examples, the comparison component 635 may be configured to support comparing the one or more second aggregate performance metrics to the one or more performance thresholds defined for the set of multiple tenants at the multi-tenant database system. In some examples, the scalability score component 640 may be configured to support generating one or more second scalability scores corresponding to the one or more second aggregate performance metrics for the second tenant based on comparing the one or more second aggregate performance metrics to the one or more performance thresholds.

In some examples, the performance threshold component 660 may be configured to support receiving an updated performance threshold for the multi-tenant database system. In some examples, the performance threshold component 660 may be configured to support updating the one or more performance thresholds defined for the set of multiple tenants in response to the updated performance threshold.

In some examples, the calculation component 630 may be configured to support calculating, for the tenant of the set of multiple tenants, one or more updated aggregate performance metrics based on updated performance data for the tenant stored in a subset of the set of data logs, where an updated performance metric of the one or more updated aggregate performance metrics is based on the design time data for the tenant, the runtime data for the tenant, or both. In some examples, the comparison component 635 may be configured to support additionally comparing the one or more updated aggregate performance metrics to the one or more performance thresholds. In some examples, the scalability score component 640 may be configured to support generating one or more updated scalability scores corresponding to the one or more updated aggregate performance metrics for the tenant based on the additional comparing.

In some examples, to support calculating the one or more aggregate performance metrics, the calculation component 630 may be configured to support determining a time frame for analysis. In some examples, to support calculating the one or more aggregate performance metrics, the calculation component 630 may be configured to support calculating, for the tenant of the set of multiple tenants, the one or more aggregate performance metrics based on a subset of the performance data for the tenant associated with activities performed during the time frame.

In some examples, the risk component 665 may be configured to support determining one or more risk classifications corresponding to the one or more scalability scores, the one or more risk classifications indicating a quantity of data logs corresponding to the one or more aggregate performance metrics that fail to satisfy the one or more performance thresholds. In some examples, the risk component 665 may be configured to support sending, for display at the user interface of the user device, an indication of the one or more risk classifications.

In some examples, the performance metric of the one or more aggregate performance metrics includes a performance bottleneck, an inefficiency of scale, customer data, or any combination thereof. In some examples, the one or more performance thresholds defined for the set of multiple tenants at the multi-tenant database system correspond to one or more resource usage thresholds, one or more latency thresholds, one or more error thresholds, or a combination thereof.

Figure 7:
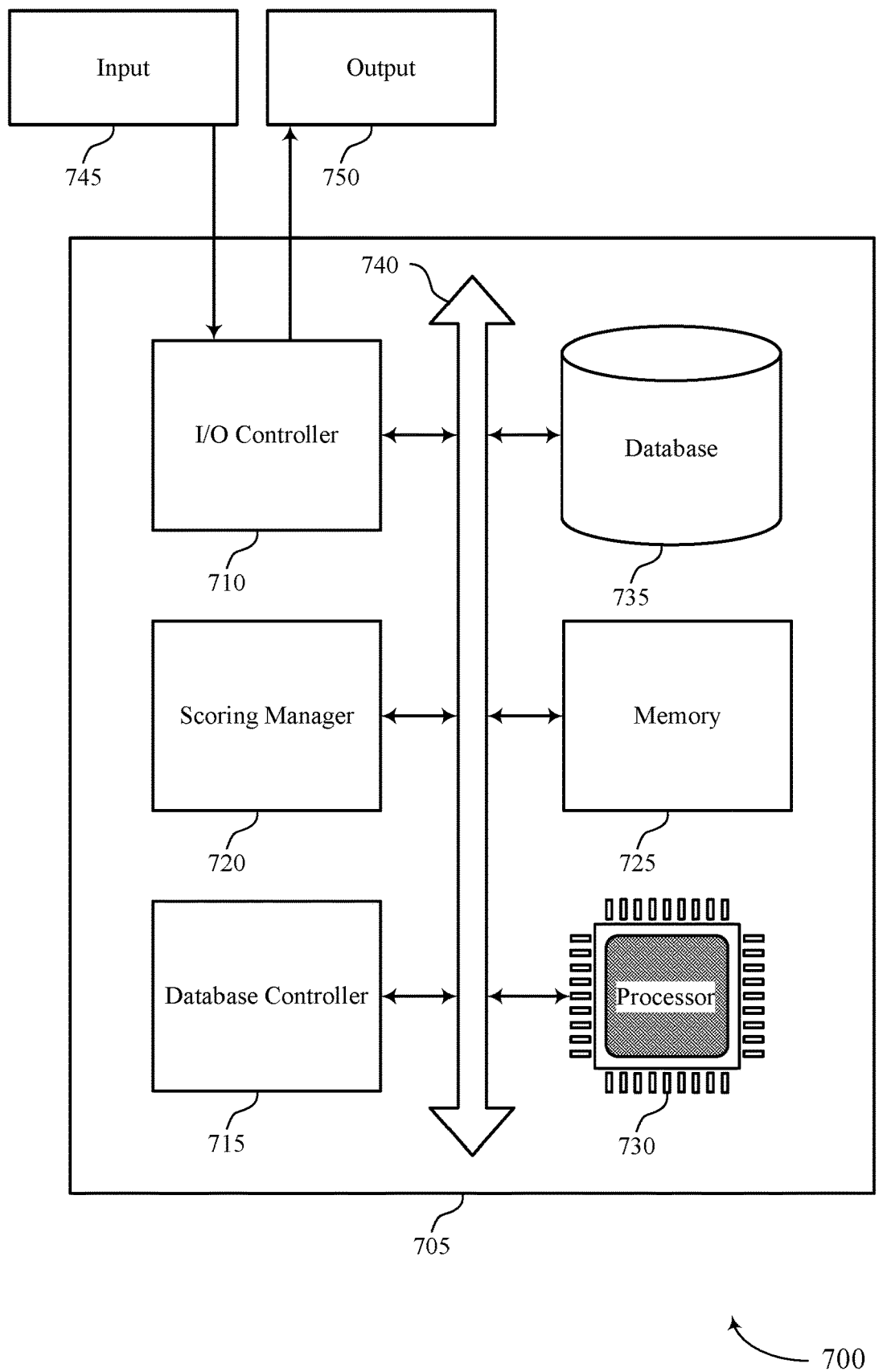
FIG. 7 shows a diagram of a system including a device that supports generating scalability scores for tenants using performance metrics in accordance with aspects of the present disclosure.

FIG. 7 shows a diagram of a system 700 including a device 705 that supports generating scalability scores for tenants using performance metrics in accordance with aspects of the present disclosure. The device 705 may be an example of or include the components of a device 505 as described herein. The device 705 may include components for bi-directional data communications including components for transmitting and receiving communications, such as a scoring manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WIN- DOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor 730 to perform various functions described herein. In some cases, the memory 725 may contain, among other things, a basic I/O system (BIOS) which may control basic hardware or software operation such as the interaction with peripheral components or devices.

The processor 730 may include an intelligent hardware device (e.g., a general-purpose processor, a digital signal processor (DSP), a CPU, a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting generating scalability scores for tenants using performance metrics).

The scoring manager 720 may support generating scalability scores for tenants at a multi-tenant database system in accordance with examples as disclosed herein. For example, the scoring manager 720 may be configured to support storing a set of data logs indicating performance data for a set of multiple tenants of the multi-tenant database system. The scoring manager 720 may be configured to support calculating, for a tenant of the set of multiple tenants, one or more aggregate performance metrics based on performance data for the tenant stored in a subset of the set of data logs, a performance metric of the one or more aggregate performance metrics based on design time data for the tenant, runtime data for the tenant, or both. The scoring manager 720 may be configured to support comparing the one or more aggregate performance metrics to one or more performance thresholds defined for the set of multiple tenants at the multi-tenant database system. The scoring manager 720 may be configured to support generating one or more scalability scores corresponding to the one or more aggregate performance metrics for the tenant based on the comparing. The scoring manager 720 may be configured to support sending, for display at a user interface of a user device, an indication of the one or more scalability scores, the user device operated by a user associated with the tenant.

By including or configuring the scoring manager 720 in accordance with examples as described herein, the device 705 may support techniques for generating scalability scores for tenants using performance metrics, which may improve an overall performance and scalability of an integration, reduce processing overhead, and improve workflow efficiencies for a specific tenant, multiple tenants in a multi-tenant system, or both.

Figure 8:
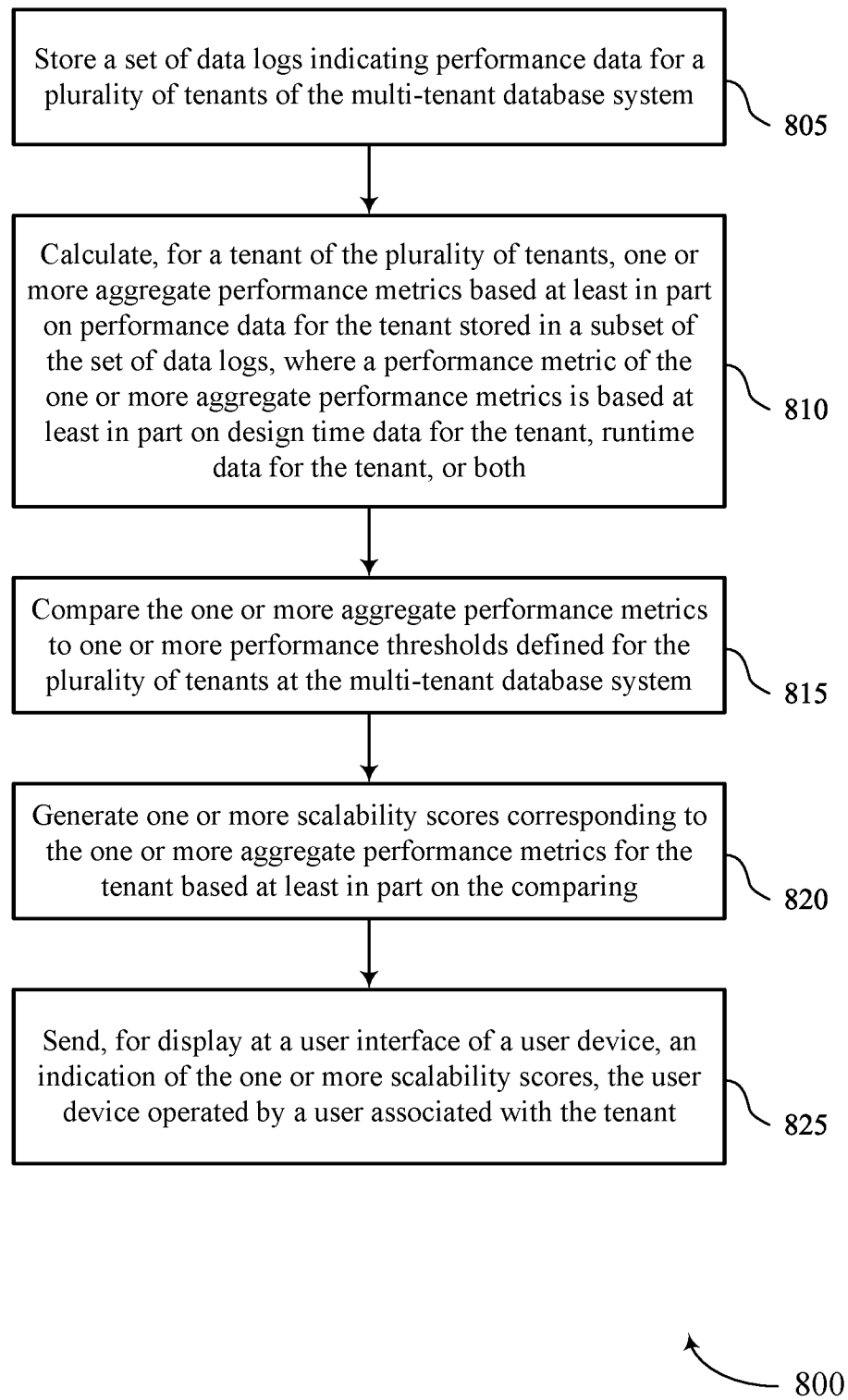
FIGS. 8 through 11 show flowcharts illustrating methods that support generating scalability scores for tenants using performance metrics in accordance with aspects of the present disclosure.

FIG. 8 shows a flowchart illustrating a method 800 that supports generating scalability scores for tenants using performance metrics in accordance with aspects of the present disclosure. The operations of the method 800 may be implemented by a scoring manager or its components as described herein. The scoring manager may be an example of, or implemented by, a processing device, such as a server, a server cluster, a worker server, a database server, cloud-based resources, a virtual machine, a container, or any combination of these or other devices capable of performing processes as described herein to generate scalability scores. For example, the operations of the method 800 may be performed by a scoring manager as described with reference to FIGS. 1 through 7. In some examples, a scoring manager may execute a set of instructions to control the functional elements of the scoring manager to perform the described functions. Additionally, or alternatively, the scoring manager may perform aspects of the described functions using special-purpose hardware.

At 805, the method may include storing a set of data logs indicating performance data for a set of multiple tenants of the multi-tenant database system. The operations of 805 may be performed in accordance with examples as disclosed herein. In some examples, aspects of the operations of 805 may be performed by a data log component 625 as described with reference to FIG. 6.

At 810, the method may include calculating, for a tenant of the set of multiple tenants, one or more aggregate performance metrics based on performance data for the tenant stored in a subset of the set of data logs, where a performance metric of the one or more aggregate performance metrics is based on design time data for the tenant, runtime data for the tenant, or both. The operations of 810 may be performed in accordance with examples as disclosed herein. In some examples, aspects of the operations of 810 may be performed by a calculation component 630 as described with reference to FIG. 6.

At 815, the method may include comparing the one or more aggregate performance metrics to one or more performance thresholds defined for the set of multiple tenants at the multi-tenant database system. The operations of 815 may be performed in accordance with examples as disclosed herein. In some examples, aspects of the operations of 815 may be performed by a comparison component 635 as described with reference to FIG. 6.

At 820, the method may include generating one or more scalability scores corresponding to the one or more aggregate performance metrics for the tenant based on the comparing. The operations of 820 may be performed in accordance with examples as disclosed herein. In some examples, aspects of the operations of 820 may be performed by a scalability score component 640 as described with reference to FIG. 6.

At 825, the method may include sending, for display at a user interface of a user device, an indication of the one or more scalability scores, the user device operated by a user associated with the tenant. The operations of 825 may be performed in accordance with examples as disclosed herein. In some examples, aspects of the operations of 825 may be performed by a display component 645 as described with reference to FIG. 6.

Figure 9:
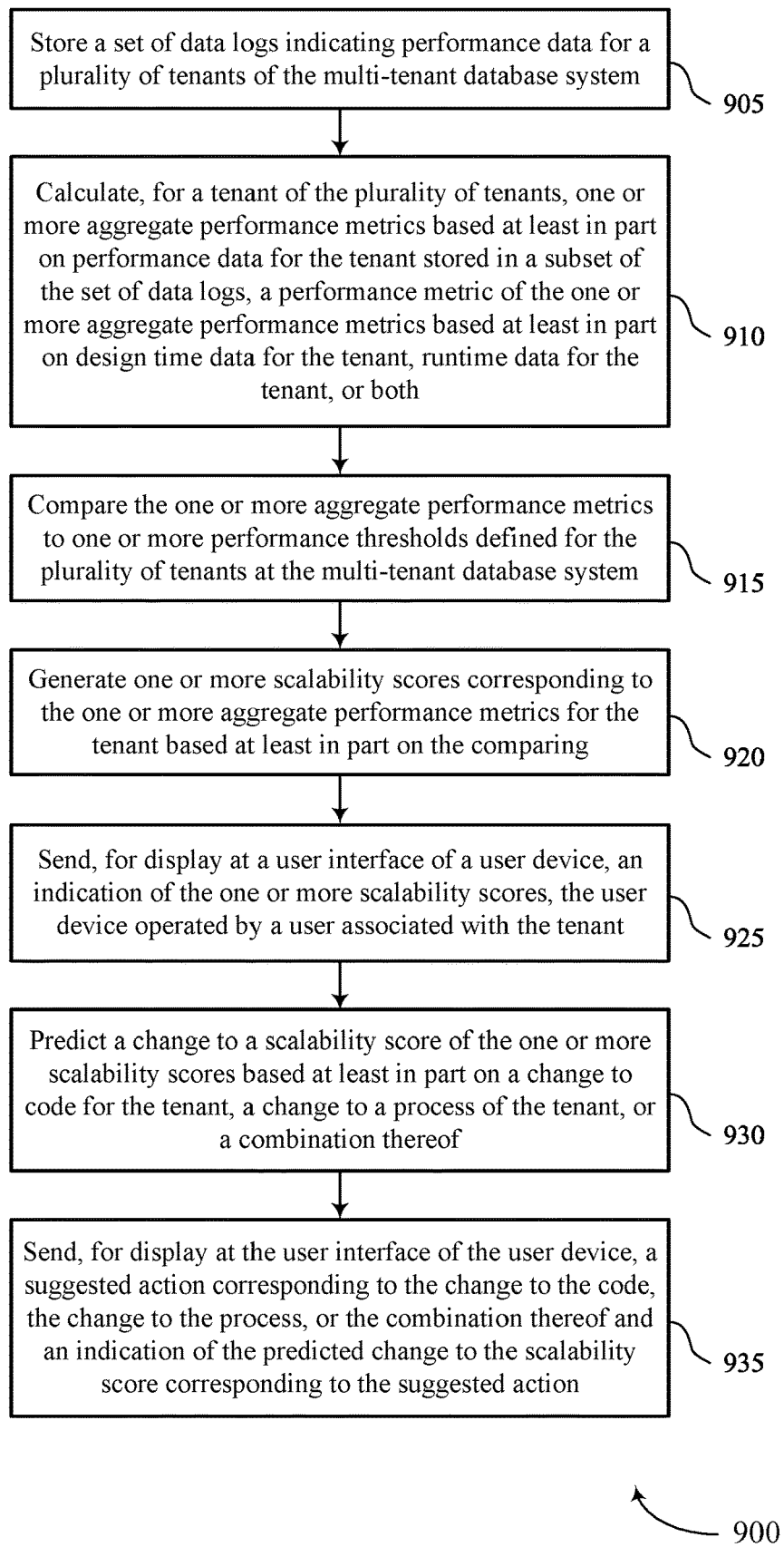

FIG. 9 shows a flowchart illustrating a method 900 that supports generating scalability scores for tenants using performance metrics in accordance with aspects of the present disclosure. The operations of the method 900 may be implemented by a scoring manager or its components as described herein. For example, the operations of the method 900 may be performed by a scoring manager as described with reference to FIGS. 1 through 7. In some examples, a scoring manager may execute a set of instructions to control the functional elements of the scoring manager to perform the described functions. Additionally, or alternatively, the scoring manager may perform aspects of the described functions using special-purpose hardware.

At 905, the method may include storing a set of data logs indicating performance data for a set of multiple tenants of the multi-tenant database system. The operations of 905 may be performed in accordance with examples as disclosed herein. In some examples, aspects of the operations of 905 may be performed by a data log component 625 as described with reference to FIG. 6.

At 910, the method may include calculating, for a tenant of the set of multiple tenants, one or more aggregate performance metrics based on performance data for the tenant stored in a subset of the set of data logs. A performance metric of the one or more aggregate performance metrics may be based on design time data for the tenant, runtime data for the tenant, or both. The operations of 910 may be performed in accordance with examples as disclosed herein. In some examples, aspects of the operations of 910 may be performed by a calculation component 630 as described with reference to FIG. 6.

At 915, the method may include comparing the one or more aggregate performance metrics to one or more performance thresholds defined for the set of multiple tenants at the multi-tenant database system. The operations of 915 may be performed in accordance with examples as disclosed herein. In some examples, aspects of the operations of 915 may be performed by a comparison component 635 as described with reference to FIG. 6.

At 920, the method may include generating one or more scalability scores corresponding to the one or more aggregate performance metrics for the tenant based on the comparing. The operations of 920 may be performed in accordance with examples as disclosed herein. In some examples, aspects of the operations of 920 may be performed by a scalability score component 640 as described with reference to FIG. 6.

At 925, the method may include sending, for display at a user interface of a user device, an indication of the one or more scalability scores, the user device operated by a user associated with the tenant. The operations of 925 may be performed in accordance with examples as disclosed herein. In some examples, aspects of the operations of 925 may be performed by a display component 645 as described with reference to FIG. 6.

At 930, the method may include predicting a change to a scalability score of the one or more scalability scores based on a change to code for the tenant, a change to a process of the tenant, or a combination thereof. The operations of 930 may be performed in accordance with examples as disclosed herein. In some examples, aspects of the operations of 930 may be performed by a prediction component 650 as described with reference to FIG. 6.

At 935, the method may include sending, for display at the user interface of the user device, a suggested action corresponding to the change to the code, the change to the process, or the combination thereof and an indication of the predicted change to the scalability score corresponding to the suggested action. The operations of 935 may be performed in accordance with examples as disclosed herein. In some examples, aspects of the operations of 935 may be performed by an action component 655 as described with reference to FIG. 6.

Figure 10:
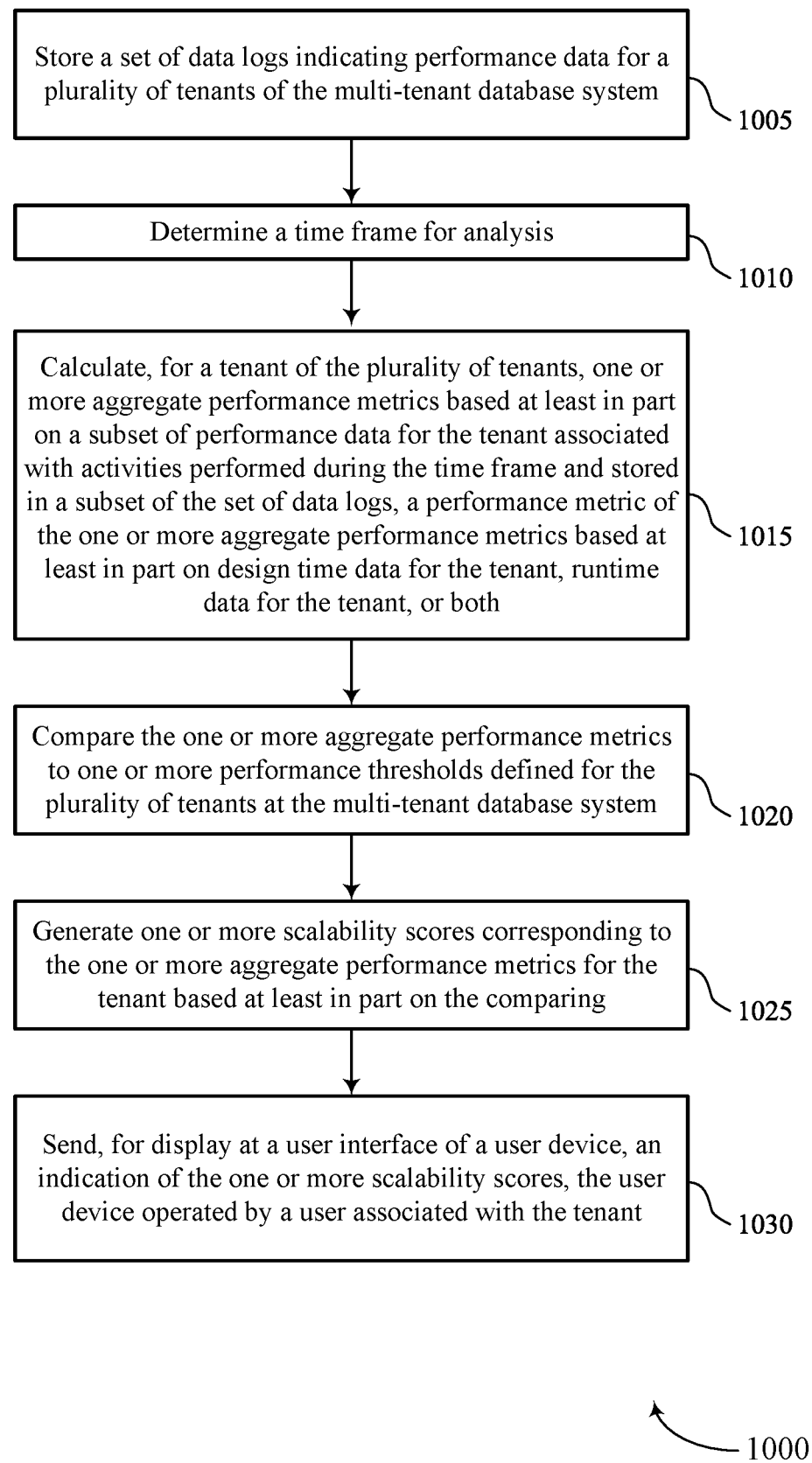

FIG. 10 shows a flowchart illustrating a method 1000 that supports generating scalability scores for tenants using performance metrics in accordance with aspects of the present disclosure. The operations of the method 1000 may be implemented by a scoring manager or its components as described herein. For example, the operations of the method 1000 may be performed by a scoring manager as described with reference to FIGS. 1 through 7. In some examples, a scoring manager may execute a set of instructions to control the functional elements of the scoring manager to perform the described functions. Additionally, or alternatively, the scoring manager may perform aspects of the described functions using special-purpose hardware.

At 1005, the method may include storing a set of data logs indicating performance data for a set of multiple tenants of the multi-tenant database system. The operations of 1005 may be performed in accordance with examples as disclosed herein. In some examples, aspects of the operations of 1005 may be performed by a data log component 625 as described with reference to FIG. 6.

At 1010, the method may include determining a time frame for analysis. The operations of 1010 may be performed in accordance with examples as disclosed herein. In some examples, aspects of the operations of 1010 may be performed by a calculation component 630 as described with reference to FIG. 6.

At 1015, the method may include calculating, for a tenant of the set of multiple tenants, one or more aggregate performance metrics based on a subset of performance data for the tenant associated with activities performed during the time frame and stored in a subset of the set of data logs. A performance metric of the one or more aggregate performance metrics may be based on design time data for the tenant, runtime data for the tenant, or both. The operations of 1015 may be performed in accordance with examples as disclosed herein. In some examples, aspects of the operations of 1015 may be performed by a calculation component 630 as described with reference to FIG. 6.

At 1020, the method may include comparing the one or more aggregate performance metrics to one or more performance thresholds defined for the set of multiple tenants at the multi-tenant database system. The operations of 1020 may be performed in accordance with examples as disclosed herein. In some examples, aspects of the operations of 1020 may be performed by a comparison component 635 as described with reference to FIG. 6.

At 1025, the method may include generating one or more scalability scores corresponding to the one or more aggregate performance metrics for the tenant based on the comparing. The operations of 1025 may be performed in accordance with examples as disclosed herein. In some examples, aspects of the operations of 1025 may be performed by a scalability score component 640 as described with reference to FIG. 6.

At 1030, the method may include sending, for display at a user interface of a user device, an indication of the one or more scalability scores, the user device operated by a user associated with the tenant. The operations of 1030 may be performed in accordance with examples as disclosed herein. In some examples, aspects of the operations of 1030 may be performed by a display component 645 as described with reference to FIG. 6.

Figure 11:
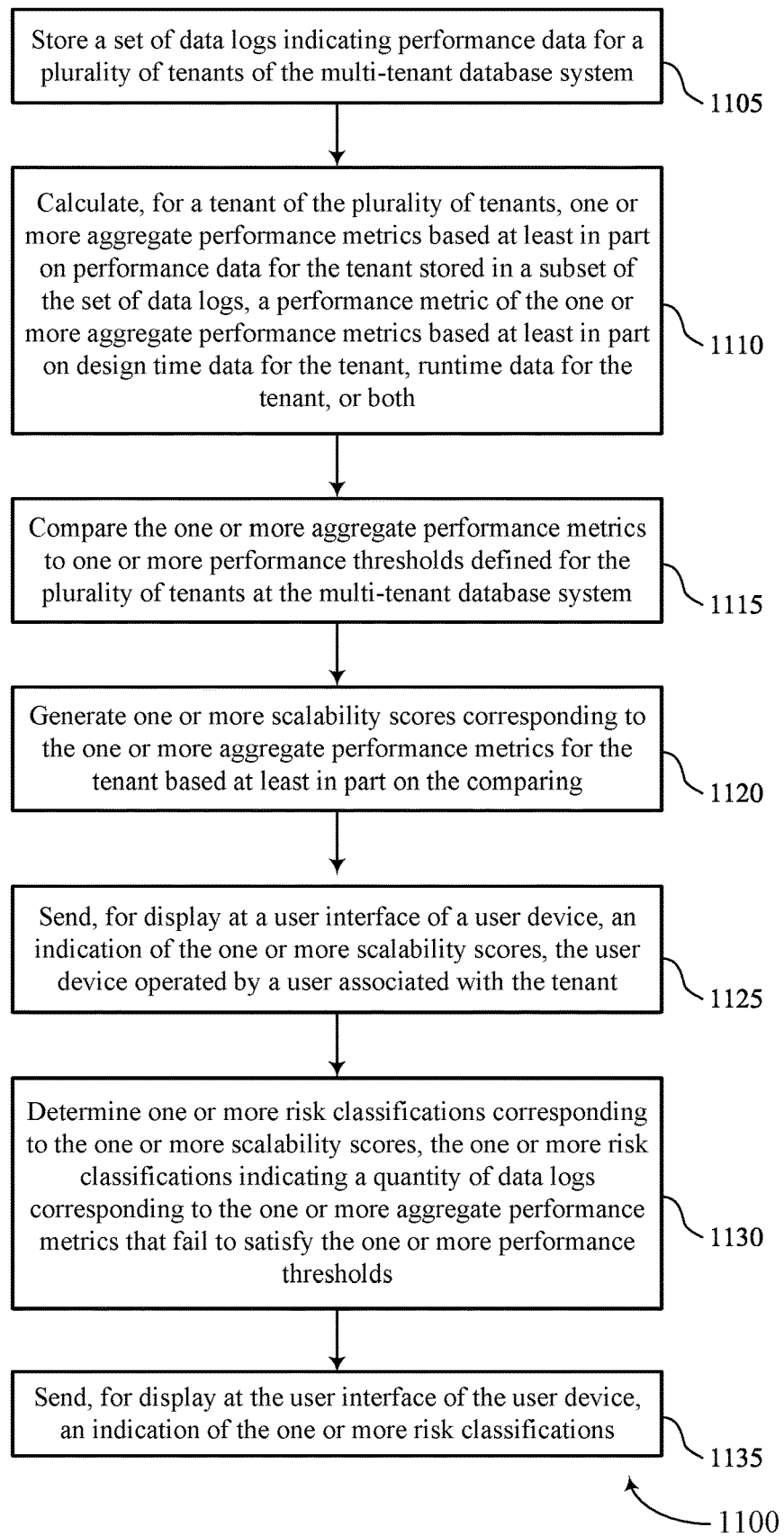

FIG. 11 shows a flowchart illustrating a method 1100 that supports generating scalability scores for tenants using performance metrics in accordance with aspects of the present disclosure. The operations of the method 1100 may be implemented by a scoring manager or its components as described herein. For example, the operations of the method 1100 may be performed by a scoring manager as described with reference to FIGS. 1 through 7. In some examples, a scoring manager may execute a set of instructions to control the functional elements of the scoring manager to perform the described functions. Additionally, or alternatively, the scoring manager may perform aspects of the described functions using special-purpose hardware.

At 1105, the method may include storing a set of data logs indicating performance data for a set of multiple tenants of the multi-tenant database system. The operations of 1105 may be performed in accordance with examples as disclosed herein. In some examples, aspects of the operations of 1105 may be performed by a data log component 625 as described with reference to FIG. 6.

At 1110, the method may include calculating, for a tenant of the set of multiple tenants, one or more aggregate performance metrics based on performance data for the tenant stored in a subset of the set of data logs. A performance metric of the one or more aggregate performance metrics may be based on design time data for the tenant, runtime data for the tenant, or both. The operations of 1110 may be performed in accordance with examples as disclosed herein. In some examples, aspects of the operations of 1110 may be performed by a calculation component 630 as described with reference to FIG. 6.

At 1115, the method may include comparing the one or more aggregate performance metrics to one or more performance thresholds defined for the set of multiple tenants at the multi-tenant database system. The operations of 1115 may be performed in accordance with examples as disclosed herein. In some examples, aspects of the operations of 1115 may be performed by a comparison component 635 as described with reference to FIG. 6.

At 1120, the method may include generating one or more scalability scores corresponding to the one or more aggregate performance metrics for the tenant based on the comparing. The operations of 1120 may be performed in accordance with examples as disclosed herein. In some examples, aspects of the operations of 1120 may be performed by a scalability score component 640 as described with reference to FIG. 6.

At 1125, the method may include sending, for display at a user interface of a user device, an indication of the one or more scalability scores, the user device operated by a user associated with the tenant. The operations of 1125 may be performed in accordance with examples as disclosed herein. In some examples, aspects of the operations of 1125 may be performed by a display component 645 as described with reference to FIG. 6.

At 1130, the method may include determining one or more risk classifications corresponding to the one or more scalability scores, the one or more risk classifications indicating a quantity of data logs corresponding to the one or more aggregate performance metrics that fail to satisfy the one or more performance thresholds. The operations of 1130 may be performed in accordance with examples as disclosed herein. In some examples, aspects of the operations of 1130 may be performed by a risk component 665 as described with reference to FIG. 6.

At 1135, the method may include sending, for display at the user interface of the user device, an indication of the one or more risk classifications. The operations of 1135 may be performed in accordance with examples as disclosed herein. In some examples, aspects of the operations of 1135 may be performed by a risk component 665 as described with reference to FIG. 6.

A method for generating scalability scores for tenants at a multi-tenant database system is described. The method may include storing a set of data logs indicating performance data for a set of multiple tenants of the multi-tenant database system, calculating, for a tenant of the set of multiple tenants, one or more aggregate performance metrics based on performance data for the tenant stored in a subset of the set of data logs, where a performance metric of the one or more aggregate performance metrics may be based on design time data for the tenant, runtime data for the tenant, or both, comparing the one or more aggregate performance metrics to one or more performance thresholds defined for the set of multiple tenants at the multi-tenant database system, generating one or more scalability scores corresponding to the one or more aggregate performance metrics for the tenant based on the comparing, and sending, for display at a user interface of a user device, an indication of the one or more scalability scores, the user device operated by a user associated with the tenant.

An apparatus for generating scalability scores for tenants at a multi-tenant database system is described. The apparatus may include a processor, memory coupled with the processor, and instructions stored in the memory. The instructions may be executable by the processor to cause the apparatus to store a set of data logs indicating performance data for a set of multiple tenants of the multi-tenant database system, calculate, for a tenant of the set of multiple tenants, one or more aggregate performance metrics based on performance data for the tenant stored in a subset of the set of data logs, where a performance metric of the one or more aggregate performance metrics may be based on design time data for the tenant, runtime data for the tenant, or both, compare the one or more aggregate performance metrics to one or more performance thresholds defined for the set of multiple tenants at the multi-tenant database system, generate one or more scalability scores corresponding to the one or more aggregate performance metrics for the tenant based on the comparing, and send, for display at a user interface of a user device, an indication of the one or more scalability scores, the user device operated by a user associated with the tenant.

Another apparatus for generating scalability scores for tenants at a multi-tenant database system is described. The apparatus may include means for storing a set of data logs indicating performance data for a set of multiple tenants of the multi-tenant database system, means for calculating, for a tenant of the set of multiple tenants, one or more aggregate performance metrics based on performance data for the tenant stored in a subset of the set of data logs, where a performance metric of the one or more aggregate performance metrics may be based on design time data for the tenant, runtime data for the tenant, or both, means for comparing the one or more aggregate performance metrics to one or more performance thresholds defined for the set of multiple tenants at the multi-tenant database system, means for generating one or more scalability scores corresponding to the one or more aggregate performance metrics for the tenant based on the comparing, and means for sending, for display at a user interface of a user device, an indication of the one or more scalability scores, the user device operated by a user associated with the tenant.

A non-transitory computer-readable medium storing code for generating scalability scores for tenants at a multi-tenant database system is described. The code may include instructions executable by a processor to store a set of data logs indicating performance data for a set of multiple tenants of the multi-tenant database system, calculate, for a tenant of the set of multiple tenants, one or more aggregate performance metrics based on performance data for the tenant stored in a subset of the set of data logs, where a performance metric of the one or more aggregate performance metrics may be based on design time data for the tenant, runtime data for the tenant, or both, compare the one or more aggregate performance metrics to one or more performance thresholds defined for the set of multiple tenants at the multi-tenant database system, generate one or more scalability scores corresponding to the one or more aggregate performance metrics for the tenant based on the comparing, and send, for display at a user interface of a user device, an indication of the one or more scalability scores, the user device operated by a user associated with the tenant.

Some examples of the method, apparatuses, and non-transitory computer-readable medium described herein may further include operations, features, means, or instructions for predicting a change to a scalability score of the one or more scalability scores based on a change to code for the tenant, a change to a process of the tenant, or a combination thereof and sending, for display at the user interface of the user device, a suggested action corresponding to the change to the code, the change to the process, or the combination thereof and an indication of the predicted change to the scalability score corresponding to the suggested action.

Some examples of the method, apparatuses, and non-transitory computer-readable medium described herein may further include operations, features, means, or instructions for determining a severity level associated with the scalability score, the severity level indicating a criticality of performing the suggested action and sending, for display at the user interface of the user device, an indication of the severity level.

In some examples of the method, apparatuses, and non-transitory computer-readable medium described herein, automatically performing the suggested action for the tenant based on the predicted change to the scalability score corresponding to the suggested action.

In some examples of the method, apparatuses, and non-transitory computer-readable medium described herein, the suggested action includes sorting the set of data logs, disabling one or more conflicting integrations, migrating the set of data logs to a data store, using batch processing, updating a runtime, or any combination thereof.

Some examples of the method, apparatuses, and non-transitory computer-readable medium described herein may further include operations, features, means, or instructions for predicting a change to a scalability score of the one or more scalability scores based at least in part on an update to code for the tenant, an update to a process of the tenant, or a combination thereof and rolling back the update to the code for the tenant, the update to the process of the tenant, or a combination thereof based at least in part on the predicted change to the scalability score.

Some examples of the method, apparatuses, and non-transitory computer-readable medium described herein may further include operations, features, means, or instructions for modifying an execution of code comprising a transaction for the multi-tenant database system based at least in part on a scalability score of the one or more scalability scores and performing the transaction as an asynchronous job, a batch job, or both based at least in part on the modified execution of the code.

Some examples of the method, apparatuses, and non-transitory computer-readable medium described herein may further include operations, features, means, or instructions for updating a database schema for the multi-tenant database system based at least in part on a scalability score of the one or more scalability scores.

Some examples of the method, apparatuses, and non-transitory computer-readable medium described herein may further include operations, features, means, or instructions for determining a tenant-specific process performed for the tenant based at least in part on the one or more aggregate performance metrics and sending, for display at the user interface of the user device, a suggested action based at least in part on the tenant-specific process and a scalability score of the one or more scalability scores.

Some examples of the method, apparatuses, and non-transitory computer-readable medium described herein may further include operations, features, means, or instructions for calculating, for a second tenant of the set of multiple tenants, one or more second aggregate performance metrics based on performance data for the second tenant stored in a second subset of the set of data logs, where a second performance metric of the one or more second aggregate performance metrics may be based on design time data for the second tenant, runtime data for the second tenant, or both, comparing the one or more second aggregate performance metrics to the one or more performance thresholds defined for the set of multiple tenants at the multi-tenant database system, and generating one or more second scalability scores corresponding to the one or more second aggregate performance metrics for the second tenant based on comparing the one or more second aggregate performance metrics to the one or more performance thresholds.

Some examples of the method, apparatuses, and non-transitory computer-readable medium described herein may further include operations, features, means, or instructions for receiving an updated performance threshold for the multi-tenant database system and updating the one or more performance thresholds defined for the set of multiple tenants in response to the updated performance threshold.

Some examples of the method, apparatuses, and non-transitory computer-readable medium described herein may further include operations, features, means, or instructions for calculating, for the tenant of the set of multiple tenants, one or more updated aggregate performance metrics based on updated performance data for the tenant stored in a subset of the set of data logs, where an updated performance metric of the one or more updated aggregate performance metrics may be based on the design time data for the tenant, the runtime data for the tenant, or both, additionally comparing the one or more updated aggregate performance metrics to the one or more performance thresholds, and generating one or more updated scalability scores corresponding to the one or more updated aggregate performance metrics for the tenant based on the additional comparing.

In some examples of the method, apparatuses, and non-transitory computer-readable medium described herein, calculating the one or more aggregate performance metrics may include operations, features, means, or instructions for determining a time frame for analysis and calculating, for the tenant of the set of multiple tenants, the one or more aggregate performance metrics based on a subset of the performance data for the tenant associated with activities performed during the time frame.

Some examples of the method, apparatuses, and non-transitory computer-readable medium described herein may further include operations, features, means, or instructions for determining one or more risk classifications corresponding to the one or more scalability scores, the one or more risk classifications indicating a quantity of data logs corresponding to the one or more aggregate performance metrics that fail to satisfy the one or more performance thresholds and sending, for display at the user interface of the user device, an indication of the one or more risk classifications.

In some examples of the method, apparatuses, and non-transitory computer-readable medium described herein, the performance metric of the one or more aggregate performance metrics includes a performance bottleneck, an inefficiency of scale, customer data, or any combination thereof.

In some examples of the method, apparatuses, and non-transitory computer-readable medium described herein, the one or more performance thresholds defined for the set of multiple tenants at the multi-tenant database system correspond to one or more resource usage thresholds, one or more latency thresholds, one or more error thresholds, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating scalability scores for tenants at a multi-tenant database system, comprising:

storing a set of data logs indicating performance data for a plurality of tenants of the multi-tenant database system, the performance data tracking processing times, processor resources, or both for executing actions at the multi-tenant database system;

calculating, for a tenant of the plurality of tenants, one or more aggregate performance metrics based at least in part on respective performance data for the tenant stored in a subset of the set of data logs, wherein a performance metric of the one or more aggregate performance metrics is based at least in part on design time data for the tenant, runtime data for the tenant, or both;

comparing the one or more aggregate performance metrics to one or more performance thresholds defined for the plurality of tenants at the multi-tenant database system;

generating one or more scalability scores corresponding to the one or more aggregate performance metrics for the tenant based at least in part on the comparison of the one or more aggregate performance metrics to the one or more performance thresholds, a scalability score of the one or more scalability scores indicating an ability to satisfy the one or more performance thresholds at an increased quantity of users for the tenant in the multi-tenant database system;

sending, for display at a user interface of a user device, an indication of the one or more scalability scores, the user device operated by a user associated with the tenant; and updating, at the multi-tenant database system, a database schema for the tenant based at least in part on a predicted change to the scalability score corresponding to the update to the database schema.

2. The method of claim 1, further comprising:

predicting a second change to a second scalability score of the one or more scalability scores based at least in part on a change to code for the tenant, a change to a process of the tenant, or a combination thereof; and sending, for display at the user interface of the user device, a suggested action corresponding to the change to the code, the change to the process, or the combination thereof and an indication of the predicted second change to the second scalability score corresponding to the suggested action.

3. The method of claim 2, further comprising:

determining a severity level associated with the second scalability score, the severity level indicating a criticality of performing the suggested action; and sending, for display at the user interface of the user device, an indication of the severity level.

4. The method of claim 2, further comprising:

automatically performing the suggested action for the tenant based at least in part on the predicted second change to the second scalability score corresponding to the suggested action.

5. The method of claim 1, further comprising:

updating a quantity of data objects in each batch for batch processing of a bulk operation for the tenant based at least in part on another predicted change to the scalability score in response to the updated quantity of data objects in each batch.

6. The method of claim 1, further comprising:

predicting a second change to a second scalability score of the one or more scalability scores based at least in part on an update to code for the tenant, an update to a process of the tenant, or a combination thereof, and rolling back the update to the code for the tenant, the update to the process of the tenant, or a combination thereof based at least in part on the predicted second change to the second scalability score.

7. The method of claim 1, further comprising:

modifying an execution of code comprising a transaction for the multi-tenant database system based at least in part on the scalability score of the one or more scalability scores; and performing the transaction as an asynchronous job, a batch job, or both based at least in part on the modified execution of the code.

8. The method of claim 1, further comprising:

determining a tenant-specific process performed for the tenant based at least in part on the one or more aggregate performance metrics; and sending, for display at the user interface of the user device, a suggested action based at least in part on the tenant-specific process and the scalability score of the one or more scalability scores.

9. The method of claim 1, further comprising:

calculating, for a second tenant of the plurality of tenants, one or more second aggregate performance metrics based at least in part on second performance data for the second tenant stored in a second subset of the set of data logs, wherein a second performance metric of the one or more second aggregate performance metrics is based at least in part on second design time data for the second tenant, second runtime data for the second tenant, or both;

comparing the one or more second aggregate performance metrics to the one or more performance thresholds defined for the plurality of tenants at the multi-tenant database system; and generating one or more second scalability scores corresponding to the one or more second aggregate performance metrics for the second tenant based at least in part on comparing the one or more second aggregate performance metrics to the one or more performance thresholds.

10. The method of claim 1, further comprising:

receiving an updated performance threshold for the multi-tenant database system; and updating the one or more performance thresholds defined for the plurality of tenants in response to the updated performance threshold.

11. The method of claim 1, further comprising:

calculating, for the tenant of the plurality of tenants, one or more updated aggregate performance metrics based at least in part on updated performance data for the tenant stored in the subset of the set of data logs, wherein an updated performance metric of the one or more updated aggregate performance metrics is based at least in part on the design time data for the tenant, the runtime data for the tenant, or both;

additionally comparing the one or more updated aggregate performance metrics to the one or more performance thresholds; and generating one or more updated scalability scores corresponding to the one or more updated aggregate performance metrics for the tenant based at least in part on the additional comparing.

12. The method of claim 1, wherein calculating the one or more aggregate performance metrics comprises:
    determining a time frame for analysis; and
    calculating, for the tenant of the plurality of tenants, the one or more aggregate performance metrics based at least in part on a subset of the respective performance data for the tenant associated with activities performed during the time frame.

13. The method of claim 1, further comprising:
    determining one or more risk classifications corresponding to the one or more scalability scores, the one or more risk classifications indicating a quantity of data logs corresponding to the one or more aggregate performance metrics that fail to satisfy the one or more performance thresholds; and
    sending, for display at the user interface of the user device, an indication of the one or more risk classifications.

14. The method of claim 1, wherein:
    the performance metric of the one or more aggregate performance metrics comprises a performance bottleneck, an inefficiency of scale, customer data, or any combination thereof; and
    the one or more performance thresholds defined for the plurality of tenants at the multi-tenant database system correspond to one or more resource usage thresholds, one or more latency thresholds, one or more error thresholds, or a combination thereof.

15. The method of claim 1, further comprising:
    sorting, in the multi-tenant database system, the subset of the set of data logs for the tenant based at least in part on another predicted change to the scalability score in response to the sorting.

16. The method of claim 1, further comprising:
    identifying a plurality of conflicting integrations in the multi-tenant database system for the tenant based at least in part on the scalability score; and
    disabling at least one conflicting integration of the plurality of conflicting integrations based at least in part on another predicted change to the scalability score in response to the disabling the at least one conflicting integration.

17. The method of claim 1, further comprising:
    migrating a portion of the set of data logs for the tenant to a different data store of the multi-tenant database system based at least in part on another predicted change to the scalability score in response to the migrating.

18. The method of claim 1, further comprising:
    updating a runtime for processing code of the tenant based at least in part on another predicted change to the scalability score in response to the updated runtime.

19. An apparatus for generating scalability scores for tenants at a multi-tenant database system, comprising:
    at least one processor;
    at least one memory coupled with the at least one processor; and
    instructions stored in the at least one memory and executable by the at least one processor to cause the apparatus to:
        store a set of data logs indicating performance data for a plurality of tenants of the multi-tenant database system, the performance data tracking processing times, processor resources, or both for executing actions at the multi-tenant database system;
        calculate, for a tenant of the plurality of tenants, one or more aggregate performance metrics based at least in part on respective performance data for the tenant stored in a subset of the set of data logs, wherein a performance metric of the one or more aggregate performance metrics is based at least in part on design time data for the tenant, runtime data for the tenant, or both;
        compare the one or more aggregate performance metrics to one or more performance thresholds defined for the plurality of tenants at the multi-tenant database system;
        generate one or more scalability scores corresponding to the one or more aggregate performance metrics for the tenant based at least in part on the comparison of the one or more aggregate performance metrics to the one or more performance thresholds, a scalability score of the one or more scalability scores indicating an ability to satisfy the one or more performance thresholds at an increased quantity of users for the tenant in the multi-tenant database system;
        send, for display at a user interface of a user device, an indication of the one or more scalability scores, the user device operated by a user associated with the tenant; and
        update, at the multi-tenant database system, a database schema for the tenant based at least in part on a predicted change to the scalability score corresponding to the update to the database schema.

20. A non-transitory computer-readable medium storing code for generating scalability scores for tenants at a multi-tenant database system, the code comprising instructions executable by a processor to:
    store a set of data logs indicating performance data for a plurality of tenants of the multi-tenant database system, the performance data tracking processing times, processor resources, or both for executing actions at the multi-tenant database system;
    calculate, for a tenant of the plurality of tenants, one or more aggregate performance metrics based at least in part on respective performance data for the tenant stored in a subset of the set of data logs, wherein a performance metric of the one or more aggregate performance metrics is based at least in part on design time data for the tenant, runtime data for the tenant, or both;
    compare the one or more aggregate performance metrics to one or more performance thresholds defined for the plurality of tenants at the multi-tenant database system;
    generate one or more scalability scores corresponding to the one or more aggregate performance metrics for the tenant based at least in part on the comparison of the one or more aggregate performance metrics to the one or more performance thresholds, a scalability score of the one or more scalability scores indicating an ability to satisfy the one or more performance thresholds at an increased quantity of users for the tenant in the multi-tenant database system;
    send, for display at a user interface of a user device, an indication of the one or more scalability scores, the user device operated by a user associated with the tenant; and
    update, at the multi-tenant database system, a database schema for the tenant based at least in part on a predicted change to the scalability score corresponding to the update to the database schema.

* * * * *